(12) United States Patent
Mortimer et al.

(10) Patent No.: US 11,160,277 B2
(45) Date of Patent: Nov. 2, 2021

(54) USE OF CHOLINIUM LYSINATE AS AN HERBICIDE

(71) Applicants: Jennifer C. Mortimer, Oakland, CA (US); Robin A. Herbert, Richmond, CA (US); Aindrila Mukhopadhyay, Oakland, CA (US); Thomas T. Eng, Berkeley, CA (US)

(72) Inventors: Jennifer C. Mortimer, Oakland, CA (US); Robin A. Herbert, Richmond, CA (US); Aindrila Mukhopadhyay, Oakland, CA (US); Thomas T. Eng, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/866,453

(22) Filed: May 4, 2020

(65) Prior Publication Data

US 2020/0345007 A1 Nov. 5, 2020

Related U.S. Application Data

(60) Provisional application No. 62/842,737, filed on May 3, 2019.

(51) Int. Cl.
*A01N 37/44* (2006.01)

(52) U.S. Cl.
CPC .................. *A01N 37/44* (2013.01)

(58) Field of Classification Search
CPC ..................................... A01N 37/44
See application file for complete search history.

(56) References Cited

U.S. PATENT DOCUMENTS

| 3,799,758 A | 3/1974 | Franz et al. |
| 2017/0349617 A1* | 12/2017 | Sun .................. C12P 19/02 |

FOREIGN PATENT DOCUMENTS

| WO | 08/106107 A1 | 9/2008 |
| WO | 11/008453 A1 | 1/2011 |
| WO | 11/039172 A1 | 4/2011 |

OTHER PUBLICATIONS

Aloni et al., "Role of cytokinin in the regulation of root gravitropism." Planta 220:177-182 (2004).
Benbrook, "Trends in glyphosate herbicide use in the United States and globally." Environ. Sci. Eur. 28:3 (2016).
Blancaflor et al., "Plant gravitropism. Unraveling the ups and downs of a complex process." Plant Physiol. 133:1677-1690 (2003).
Campos et al., "How omics technologies can enhance chemical safety regulation: perspectives from academia, government, and industry." Environ. Toxicol. Chem. 37:1252-1259 (2018).

(Continued)

*Primary Examiner* — Trevor Love
(74) *Attorney, Agent, or Firm* — Robin C. Chiang; Lawrence Berkeley National Laboratory

(57) ABSTRACT

The present invention provides for an herbicidal composition comprising a cholinium lysinate [Ch][Lys], and a method for controlling the growth of one or more plants, comprising applying the herbicidal composition thereof.

12 Claims, 10 Drawing Sheets

(56) References Cited

OTHER PUBLICATIONS

Cartieaux et al., "Transcriptome analysis of *Arabidopsis* colonized by a plant-growth promoting rhizobacterium reveals a general effect on disease resistance." The Plant Journal 36:177-188 (2003).
Çetinkol et al., "Understanding the impact of ionic liquid pretreatment on eucalyptus." Biofuels 1:33-46 (2010).
Chiu et al., "Toxicity of pine monoterpenes to mountain pine beetle." Sci. Rep. 7:8858 (2017), 8 pages.
Christensson et al., "Limonene hydroperoxide analogues differ in allergenic activity." Contact Derm 59:344-352 (2008).
Chubukov et al., "Acute Limonene Toxicity in *Escherichia coli* Is Caused by Limonene Hydroperoxide and Alleviated by a Point Mutation in Alkyl Hydroperoxidase AhpC." Appl. Environ. Microbiol. 81:4690-4696 (2015).
Contreras-Comejo et al., "Mitogen-Activated Protein Kinase 6 and Ethylene and Auxin Signaling Pathways Are Involved in *Arabidopsis* Root-System Architecture Alterations by Trichoderma atroviride." Mol. Plant Microbe Interact. 28:701-710. (2015).
Coupe, "Trends in pesticide use on soybean, corn and cotton since the introduction of major genetically modified crops in the United States." Pest Manag Sci 72:1013-1022 (2016).
Eisenhauer, "From climate chambers to biodiversity chambers." Front. Ecol. Environ. 16:136-137 (2018).
Eudes et al., "Exploiting the Substrate Promiscuity of Hydroxycinnamoyl-CoA:Shikimate Hydroxycinnamoyl Transferase to Reduce Lignin." Plant Cell Physiol. 57:568-579 (2016).
Eudes et al., "Expression of S-adenosylmethionine Hydrolase in Tissues Synthesizing Secondary Cell Walls Alters Specific Methylated Cell Wall Fractions and Improves Biomass Digestibility." Front. Bioeng. Biotechnol. 4:58 (2016).
Finkel et al., "Understanding and exploiting plant beneficial microbes." Curr. Opin. Plant Biol. 38:155-163 (217).
Gao et al., "Ecosystem Fabrication (EcoFAB) Protocols for the Construction of Laboratory Ecosystems Designed to Study Plant-microbe Interactions." J. Vis. Exp. (2018), 16 pages.
Goh et al., "Improving methyl ketone production in *Escherichia coli* by heterologous expression of NADH-dependent FabG. Biotechnol. Bioeng." 115:1161-1172 (2018).
Harvey et al., "High-Density Renewable Fuels Based on the Selective Dimerization of Pinenes." Energy Fuels 24:267-273 (2010).
Hayashi et al., "Transformation of *Arabidopsis thaliana* with the codA gene for choline oxidase; accumulation of glycinebetaine and enhanced tolerance to salt and cold stress." Plant J. 12:133-142 (1997).
Herrera Paredes et al., "Design of synthetic bacterial communities for predictable plant phenotypes." PLoS Biol. 16: e2003962 (2018), 41 pages.
Hollingsworth et al., "Limonene, a citrus extract, for control of mealybugs and scale insects." Ec. 98:772-779 (2005).
Huang et al., "*Mitsuaria* sp. and *Burkholderia* sp. from *Arabidopsis* rhizosphere enhance drought tolerance in *Arabidopsis thaliana* and maize (*Zea mays* L.)." Plant Soil. 419: 523-539 (2017).

Hou et al., "Evaluation of Toxicity and Biodegradability of Cholinium Amino Acids Ionic Liquids" Plos One 8:e59145 (2013) 7 pages.
Letunic et al., "Interactive Tree of Life v2: online annotation and display of phylogenetic trees made easy." Nucleic Acids Res. 39:W475-8 (2011).
Levy et al., "Genomic features of bacterial adaptation to plants." Nat. Genet. 50:138-150 (2018).
Liu et al., "Klebsiella pneumonia SnebYK Mediates Resistance Against Heterodera glycines and Promotes Soybean Growth." Front. Microbiol. 9:1134 (2018), 13 pages.
Lobet et al., "A novel image-analysis toolbox enabling quantitative analysis of root system architecture." Plant Physiol. 157:29-39 (2011).
Lundberg et al., "Defining the core *Arabidopsis thaliana* root microbiome." Nature 488:86-90 (2012).
Mortimer, "Plant synthetic biology could drive a revolution in biofuels and medicine." Exp. Biol.Med. 244: 323-331 (2019).
Neupane et al., Life-Cycle Greenhouse Gas and Water Intensity of Cellulosic Biofuel Production Using Cholinium Lysinate Ionic Liquid Pretreatment. ACS Sustain. Chem. Eng. 5:10176-10185 (2017).
Pérez-Pimienta et al., Sequential enzymatic saccharification and fermentation of ionic liquid and organosolv pretreated agave bagasse for ethanol production. Bioresour. Technol. 225:191-198. Elsevier (2017).
Pernak et al., "Ionic liquids as herbicides and plant growth regulators." Tetrahedron 69:4665-4669 (2013).
Phelan et al., "Engineering terpene biosynthesis in Streptomyces for production of the advanced biofuel precursor bisabolene." ACS Synth. Biol. 4:393-399 (2015).
Pinedo et al., Burkholderia phytofirmans PsJN induces long-term metabolic and transcriptional changes involved in *Arabidopsis thaliana* salt tolerance. Front. Plant Sci. 6:466 (2015), 17 pages.
Riou, "Osmoregulation in Azospirillum brasilense: glycine betaine transport enhances growth and nitrogen fixation under salt stress." J. Gen. Microbiol. 136:1455-1461 (1990).
Rivas da Silva et al., "Biological activities of α-pinene and β-pinene enantiomers." Molecules 17:6305-6316 (2012).
Sasaki et al., "Engineering Corynebacterium glutamicum to produce the biogasoline isopentenol from plant biomass hydrolysates." Biotechnol Biofuels 12:41 (2019), 15 pages.
Schneider et al., "NIH Image to ImageJ: 25 years of image analysis." Nat. Methods 9:671-675 (2012).
Sun et al., "Understanding pretreatment efficacy of four cholinium and imidazolium ionic liquids by chemistry and computation." Green Chem. 16:2546-2557 (2014).
Venturelli et al., "Deciphering microbial interactions in synthetic human gut microbiome communities." Mol. Syst. Biol. 14:e8157 (2018), 19 pages.
Wang et al., "Endophytic microbes *Bacillus* sp. LZR216-regulated root development is dependent on polar auxin transport in *Arabidopsis* seedlings." Plant Cell Rep. 34:1075-1087 (2015).
Zhang et al., "Multi-level engineering facilitates the production of phenylpropanoid compounds in tomato." Nat. Commun. 6:8635 (2015), 11 pages.

\* cited by examiner

USE OF CHOLINIUM LYSINATE AS AN HERBICIDE

CROSS-REFERENCE TO RELATED APPLICATIONS

This application claims priority to U.S. Provisional Patent Application Ser. No. 62/842,737, filed on May 3, 2019, which is hereby incorporated by reference in its entirety.

STATEMENT OF GOVERNMENTAL SUPPORT

The invention was made with government support under Contract Nos. DE-AC02-05CH11231 awarded by the U.S. Department of Energy. The government has certain rights in the invention.

FIELD OF THE INVENTION

The present invention is in the field of herbicides.

BACKGROUND OF THE INVENTION

Concerns over oil prices, as well as the harm caused by fossil fuel consumption has accelerated bioeconomy-related research (Mortimer 2018 Sep. 24). This includes plants genetically engineered to synthesize valuable compounds (Zhang et al. 2015; Eudes, Pereira, et al. 2016; Eudes, Zhao, et al. 2016), methods developed to liberate those chemicals or intermediates and a maximum amount of accessible carbon from plant biomass (Neupane et al. 2017; Pérez-Pimienta et al. 2017; Yuan et al. 2017), as well as microorganisms engineered to efficiently convert plant-derived carbon into desirable products (Phelan et al. 2015; Goh et al. 2018; Sasaki et al. 2019) (FIG. 1).

The development and deployment of these technologies will greatly expand the range of accessible bio-derived chemicals, many of which have not been evaluated for effects on the environment. This gap in knowledge is problematic considering the potential scale of accidental exposure—biofuel production alone is projected to expand ~200 Million Tonnes of Oil Equivalent (Mtoe) by 2040 (IEA 2018), and hence will come under regulation by the Frank R. Lautenberg Chemical Safety for the 21st Century Act in the US, and by the Registration, Evaluation, Authorization and Restriction of Chemicals (REACH) Regulation in the EU. In addition, these chemicals may have valuable secondary applications yet to be discovered. For example, the promising biofuel candidates α-pinene and D-limonene have been implicated as insecticides (Hollingsworth 2005; Chiu, Keeling, and Bohlmann 2017), antimicrobials (Rivas da Silva et al. 2012; Zahi et al. 2017) and therapeutics for several conditions (Lappas and Lappas 2012; Nam et al. 2014). A bioactivity screen of candidate chemicals may therefore inform both their risk management as well as their industrial value and utilities.

To date, chemical safety evaluation pipelines focus on a handful of model organisms (Campos et al. 2018), whereas chemicals released into the environment affect functioning ecosystems. Ecotoxicological studies have attempted to predict multi-trophic effects by looking at a representative primary producer (an algae), a planktonic crustacean, and a fish, but are nonetheless studied in an isogenic culture (Campos et al. 2018). Micro-organisms are present in these systems, in that the animals and plants are not xenobiotic, but the activity or functionality of the microbiome is not assessed. Chemical exposures may affect host cells and associated microbial communities—and only a handful of studies have assessed the importance of the microbiome in assessing risks, and these predominantly in animal systems (Wilson and Nicholson 2017). Plants have a wide-range of associated microbes, many of which are known to alter plant physiology (Finkel et al. 2017; Liu et al. 2018), making these interactions critical to understanding how plants transduce and respond to signals in their environment, including the effects of chemical treatment. Progress has been hampered in part by the fact that only a small number of non-pathogenic plant-associated microbes have been characterized well. The recent resolution of the root microbiome (rhizobiome) of the dicotyledonous model plant *Arabidopsis thaliana* (*Arabidopsis*) (Lundberg et al. 2012; Levy et al. 2018), however, provides an opportunity to explore the effect of relevant plant-associated microorganisms on the bioactivity of industrially-relevant chemicals.

SUMMARY OF THE INVENTION

The present invention provides for an herbicidal composition comprising a cholinium lysinate [Ch][Lys]. In some embodiments, the herbicide composition further comprises a second herbicide, a herbicidal safener, an agriculturally acceptable adjuvant or carrier, or a combination thereof. In some embodiments, the herbicide composition lacks an herbicidal safener.

In some embodiments, the concentration of the [Ch][Lys] is at least or up to about 0.1 mM, 0.5 mM, 1 mM, 5 mM, 10 mM, and 50 mM, or a range of concentration of any two preceding values.

The present invention provides for a method for controlling the growth of one or more plants, comprising applying an herbicidal composition of the present invention to a plant or soil in a place where the plant grows or will grow. In some embodiments, the plant is a monocot or dicot. In some embodiments, the plants comprise at least one monocot plant and at least one dicot plant. In some embodiments, the plant is a weed, such as Johnson grass, quack grass, barnyard grass), and/or woolly cupgrass; or a non-native invasive plant, such as the brown algae Sargassum. In some embodiments, the weed is any plant is not desired, or which the practitioner of the present invention wants to reduce the growth or kill thereof. In some embodiments, the plant is an *Arabidopsis* species or *Sorghum* species. In some embodiments, the weed is resistant to a glyphosate or a salt thereof. In some embodiments, the soil is a cropland, or a uncultivated land deliberately not developed in order to promote the growth of native flora and/or fauna. In some embodiments, the applying step comprises applying at least or up to about 100 g, 500 g, 1 kg, 5 kg, or 10 kg, or a value within the range of any two preceding values thereof, of cholinium lysinate [Ch][Lys] to each hectare of cropland. In some embodiments, the applying step comprises applying at least or up to about 100 g to about 500 g of cholinium lysinate [Ch][Lys] to each hectare of cropland. In some embodiments, the method further comprises planting a commercial crop after the applying step.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Figure 1:
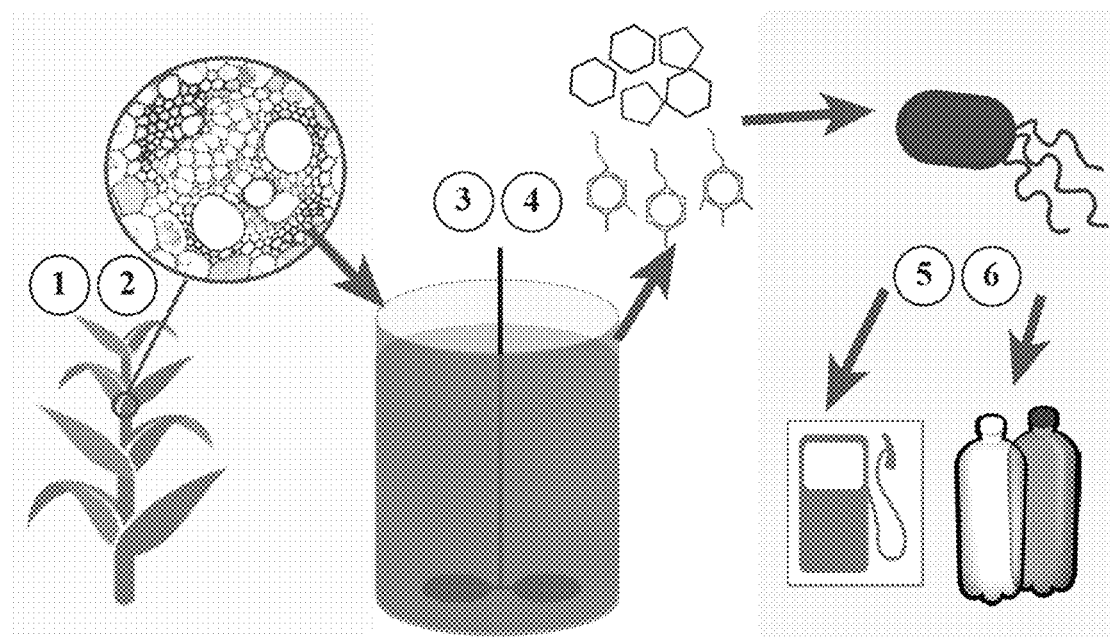
FIG. 1. Schematic of an advanced biomass to biofuel production pipeline. Bioenergy crops are engineered for improved biomass composition (green shaded box). Biomass is chemically pre-treated and enzymatically hydrolyzed to release sugars and lignin (orange shaded box). Engineered microbes then convert these components into the desired final product. The role of the compounds tested in this study are marked on the schematic: protocatechuate, (1); p-coumarate, (2); [Ch][Lys], (3); [$C_2C_1$im][OAc], (4); α-pinene, (5); and D-limonene, (6) (see Table 1 for details).

Before the invention is described in detail, it is to be understood that, unless otherwise indicated, this invention is not limited to particular sequences, expression vectors, enzymes, host microorganisms, or processes, as such may vary. It is also to be understood that the terminology used herein is for purposes of describing particular embodiments only and is not intended to be limiting.

In this specification and in the claims that follow, reference will be made to a number of terms that shall be defined to have the following meanings:

The terms "optional" or "optionally" as used herein mean that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

As used in the specification and the appended claims, the singular forms "a," "an," and "the" include plural referents unless the context clearly dictates otherwise. Thus, for example, reference to an "ionic liquid" includes an ionic liquid compound as well as a plurality of ionic liquid compounds of a specific species.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

The term "about" refers to a value including 10% more than the stated value and 10% less than the stated value.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

A use for the ionic liquid cholinium lysinate [Ch][Lys] as an herbicide at low concentration application has been identified. [Ch][Lys] is proposed as a bulk chemical for deconstruction of biomass for biofuels, and therefore will likely be available at low cost in the near future. [Ch][Lys] has low toxicity for mammals, fish, and microbes. It is shown herein that it can affect, i.e., reduce growth of, both a dicot (*Arabidopsis*) and a monocot (*Sorghum bicolor*). [Ch][Lys] is also biodegradable in the environment making it an ideal foliar application.

The present invention also provides for a system for screening the bioactivity of biofuel relevant compounds on seedlings, comprising the method described herein. [Ch][Lys] is an effective pre-treatment for biomass in a biofuel production process. It can be made from bulk chemicals and has reported low toxicity to mammals, fish, and microbes (Sun et al. 2014). It is also rapidly degraded in the environment (Hou et al. 2013).

Figure 7:
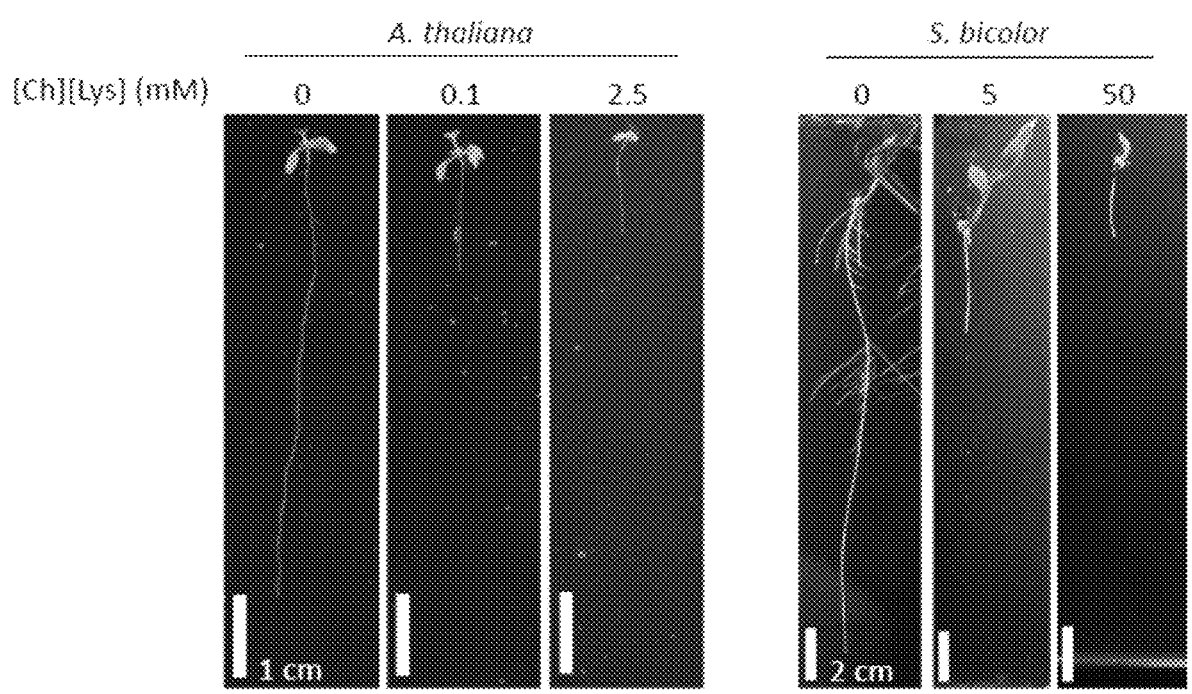
FIG. 7. Effect of the concentration of [Ch][Lys] on *A. thaliana* and *S. bicolor*.

When seedlings are transferred to solid media containing low concentrations of [Ch][Lys](0.1-5 mM; 25 mg/1-1.2 g/L) the plants show reduced root growth (0.1 mM) to complete chlorosis and plant death (5 mM). By comparison, 0.4 mM glyphosate is used for plate selection. This is tested on both a monocot (*Sorghum bicolor*) and a dicot (*Arabidopsis thaliana*), with similar results. See FIG. 7.

[Ch][Lys] as a potential herbicide, with low persistence in the environment, reported low toxicity to non-target organisms, and relatively low cost. It is estimated that as little as 100-500 g/ha may be appropriate. Estimated bulk cost is $2/kg (minimum $1.43/kg. max $5; Neupane et al. 2017). This is as compared to rising glyphosate prices (~$2 kg in 2016, and ~$4 kg in 2017) due to tighter environmental controls on production plants in China. There is a global market of around $5 billion for glyphosate.

[Ch][Lys] can be used as a broad spectrum post-emergence herbicide, given its rapid breakdown in the environment. For example, it could be used to target noxious weeds such as Johnson grass (a very close relative of *sorghum*, which has emerging glyphosate resistance), which are challenging to control. It is also proposed that [Ch][Lys] could be used to tackle emerging invasive plants, such as the brown algae Sargassum. Advantages of using [Ch][Lys] as a herbicide include: it is highly water soluble, and so could easily be applied to foliage; has lower toxicity than existing herbicides; has lower cost than commercially available herbicide; has low persistence in the environment; and can be biologically derived.

In some embodiments, the second herbicide is protocatechuate, p-coumarate, $[C_2C_2im][OAc]$, $[C_2C_1im][OAc]$, α-pinene, or D-limonene. In some embodiments, the concentration of the protocatechuate, p-coumarate, $[C_2C_2im][OAc]$, $[C_2C_1im][OAc]$, α-pinene, or D-limonene is at least or up to about 0.1 mM, 0.5 mM, 1 mM, 5 mM, 10 mM, and 50 mM, or a range of concentration of any two preceding values.

In some embodiments, the second herbicide is an ionic liquid that is not cholinium lysinate [Ch][Lys]. In some embodiments, the concentration of the ionic liquid that is not cholinium lysinate [Ch][Lys] is at least or up to about 0.1 mM, 0.5 mM, 1 mM, 5 mM, 10 mM, and 50 mM, or a range of concentration of any two preceding values.

In some embodiments, the second herbicide is 1-alkyl-3-alkylimidazolium alkanate, 1-alkyl-3-alkylimidazolium alkylsulfate, 1-alkyl-3-alkylimidazolium methylsulfonate, 1-alkyl-3-alkylimidazolium hydrogensulfate, 1-alkyl-3-alkylimidazolium thiocyanate, and 1-alkyl-3-alkylimidazolium halide, wherein an "alkyl" is an alkyl group comprising from 1 to 10 carbon atoms, and an "alkanate" is an alkanate comprising from 1 to 10 carbon atoms. In some embodiments, the "alkyl" is an alkyl group comprising from 1 to 4 carbon atoms. In some embodiments, the "alkyl" is a methyl group, ethyl group or butyl group. In some embodiments, the "alkanate" is an alkanate comprising from 1 to 4 carbon atoms. In some embodiments, the "alkanate" is an acetate. In some embodiments, the halide is chloride.

In some embodiments, the second herbicide is 1-ethyl-3-methylimidazolium acetate ($C_2C_1$im Acetate), 1-ethyl-3-methylimidazolium chloride ($C_2C_1$im Cl), 1-ethyl-3-methylimidazolium hydrogensulfate ($C_2C_1$im $HOSO_3$), 1-ethyl-3-methylimidazolium methylsulfate ($C_2C_1$im $MeOSO_3$), 1-ethyl-3-methylimidazolium ethylsulfate ($C_2C_1$im $EtOSO_3$), 1-ethyl-3-methylimidazolium methanesulfonate ($C_2C_1$im $MeSO_3$), 1-ethyl-3-methylimidazolium tetrachloroaluminate ($C_2C_1$im $AlCl_4$), 1-ethyl-3-methylimidazolium thiocyanate ($C_2C_1$im SCN), 1-butyl-3-methylimidazolium acetate (BMIM Acetate), 1-butyl-3-methylimidazolium chloride (BMIM Cl), 1-butyl-3-methylimidazolium hydrogensulfate (BMIM HOSO$_3$), 1-butyl-3-methylimidazolium methanesulfonate (BMIM MeSO$_3$), 1-butyl-3-methylimidazolium methylsulfate (BMIM MeOSO$_3$), 1-butyl-3-methylimidazolium tetrachloroaluminate (BMIM AlCl$_4$), 1-butyl-3-methylimidazolium thiocyanate (BMIM SCN), 1-ethyl-2,3-dimethylimidazolium ethylsulfate (EDIM EtOSO$_3$), Tris(2-hydroxyethyl)methylammonium methylsulfate (MTEOA MeOSO$_3$), 1-methylimidazolium chloride (MIM Cl), 1-methylimidazolium hydrogensulfate (MIM HOSO$_3$), 1,2,4-trimethylpyrazolium methylsulfate, tributylmethylammonium methylsulfate, choline acetate, choline salicylate, and the like.

In some embodiments, the ionic liquid that is not cholinium lysinate [Ch][Lys] has one or more of the following properties: biodegradable in the environment (such as biodegradable in the environment at a rate that is equal to or greater than that of cholinium lysinate), and low or no toxicity to mammals, fish, and/or microbes (such as having a toxicity to mammals, fish, and/or microbes that is equal to or less than that of cholinium lysinate).

In some embodiments, the second herbicide is a glyphosate or a salt thereof. Glyphosate or a salt thereof used in the present invention may be either in a form of an acid of glyphosate, or a form of a salt of glyphosate, and a form of a salt of glyphosate is usually used. In some embodiments, the salt of glyphosate is glyphosate isopropylamine salt, glyphosate-trimethylsulfonium, glyphosate-ammonium, glyphosate-diammonium, glyphosate-sodium, glyphosate-potassium, glyphosate guanidine derivative salts, glyphosate choline salt and glyphosate N,N-Bis(3-aminopropyl)methylamine salt. Such glyphosates or salts thereof are described in U.S. Pat. No. 3,799,758, WO 08/106,107, WO 11/008,453 and WO 11/039,172, and can be produced by any known production method.

In some embodiments, the second herbicide is an acetochlor, acifluorfen, aclonifen, acrolein, alachlor, allidochlor, alloxydim, allyl alcohol, alorac, ametridione, ametryn, amibuzin, amicarbazone, amidosulfuron, amiprofos-methyl, amitrole, ammonium sulfamate, anilofos, anisuron, asulam, atraton, atrazine, azafenidin, aziprotryne, barban, BCPC, beflubutamid, benazolin, bencarbazone, benfluralin, benfuresate, bensulide, benthiocarb, bentazon-sodium, benzadox, benzfendizone, benzipram, benzobicyclon, benzofenap, benzofluor, benzoylprop, benzthiazuron, bicyclopyrone, bifenox, bilanafos, borax, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cacodylic acid, cafenstrole, calcium chlorate, calcium cyanamide, carbasulam, carbetamide, carboxazole, chlorprocarb, carfentrazone-ethyl, CDEA, CEPC, chlomethoxyfen, chloranocryl, chlorazifop, chlorazine, chlorbromuron, chlorbufam, chloreturon, chlorfenac, chlorfenprop, chlorflurazole, chlorflurenol, chloridazon, chlorimuron, chlormequat, chlornitrofen, chloropon, chlorotoluron, chloroxuron, chloroxynil, chlorpropham, chlorsulfuron, chlorthal, chlorthiamid, cinidon-ethyl, cinmethylin, cisanilide, clacyfos, clethodim, cliodinate, clodinafop, clofop, clomazone, cloproxydim, cloransulam-methyl, CMA, copper sulfate, CPMF, CPPC, credazine, cresol, cumyluron, cyanatryn, cvanazine, cycloate, cyclopyrimorate, cyclosulfamuron, cycloxydim, cycluron, cyhalofop, cyperquat, cyprazine, cyprazole, cypromid, daimuron, dalapon, dazomet, delachlor, desmedipham, desmetryn, di-allate, dichlobenil, dichloralurea, dichlormate, diclofop, diclosulam, diethamquat, diethatyl, difenopenten, difenoxuron, difenzoquat, diflufenican, dimefuron, dimepiperate, dimethachlor, dimethametryn, dimethenamid, dimethenamid-P, dimexano, dimidazon, dinitramine, dinofenate, dinoprop, dinosam, dinoseb, dinoterb, diphenamid, dipropetryn, diquat, dithiopyr, diuron, DMPA, DNOC, DSMA, EBEP, eglinazine, endothal, epronaz, EPTC, esprocarb, etalfluralin, ethbenzamide, ethametsulfuron, ethidimuron, ethiolate, ethobenzamid, etobenzamid, ethofumesate, ethoxyfen, etinofen, etobenzanid, EXD, fenasulam, isoxadifen-ethyl, fenoxaprop, fenoxaprop-P, fenoxasulfone, fenthiaprop, fenquinotrione, fentrazamide, fenuron, ferrous sulfate, flamprop, flamprop-M, fluazifop, fluazifop-P, fluazolate, flucarbazone, flucetosulfuron, fluchloralin, flufenacet, flufenican, flufenpyr-ethyl, flumetsulam, flumezin, flumiclorac-pentyl, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone, flurochloridone, flurtamone, fluthiacet, fomesafen, foramsulfuron, fosamine, fumiclorac, furyloxyfen, glufosinate, glufosinate-ammonium, glufosinate-P-ammonium, glyphosate salts and esters, halosafen, haloxydine, haloxyfop, haloxyfop-P, hexachloroacetone, hexaflurate, hexazinone, IAA, IBA, imazamethabenz, imazapic, imazapyr, imazaquin, indanofan, indaziflam, iodobonil, iodomethane, iodosulfuron, iodosulfuron-ethyl-sodium, iofensulfuron, ioxynil, ipazine, ipfencarbazone, iptymidam, isocarbamid, isocil, isomethiozin, isonoruron, isopolinate, isopropalin, isoproturon, isouron, isoxaben, isoxachlortole, isoxaflutole, isoxpyrifop, karbutilate, ketospiradox, kuicaoxi, lactofen, lenacil, linuron, MAA, MAMA, medinoterb, mefenacet, mefluidide, mesoprazine, mesosulfuron, mesotrione, metam, metamifop, metamitron, metazachlor, metflurazon, methabenzthiazuron, methalpropalin, methazole, methiobencarb, methiozolin, methiuron, methometon, methoprotryne, methyl bromide, methyl isothiocyanate, methyldymron, metobenzuron, metobromuron, metolachlor, metosulam, metoxuron, metribuzin, molinate, monalide, monisouron, monochloroacetic acid, monolinuron, monuron, morfamquat, MSMA, naproanilide, napropamide, napropamide-M, neburon, nicosulfuron, nipyraclofen, nitralin, nitrofen, nitrofluorfen, norflurazon, noruron, orbencarb, ortho-dichlorobenzene, oryzalin, oxadiargyl, oxadiazon, oxapyrazon, oxasulfuron, oxaziclomefone, oxyfluorfen, paraflufen-ethyl, parafluron, paraquat, pebulate, pelargonic acid, pendimethalin, pentachlorophenol, pentanochlor, pentoxazone, perfluidone, pethoxamid, phenisopham, phenmedipham, phenmedipham-ethyl, phenobenzuron, phenylmercury acetate, picolinafen, pinoxaden, piperophos, potassium arsenite, potassium azide, potassium cyanate, pretilachlor, primisulfuron-methyl, procyazine, prodiamine, profluazol, profluralin, profoxydim, proglinazine, prohexadione-calcium, prometon, prometlyn, pronamide, propachlor, propanil, propaquizafop, propazine, propham, propisochlor, propoxycarbazone, propyzamide, prosulfalin, prosulfocarb, prosulfuron, proxan, prynachlor, pydanon, pyraclonil, pyraflufen-ethyl, pyrasulfotole, pyrazogyl, pyrazolynate, pyrazoxyfen, pyributicarb, pyriclor, pyridafol, pyridate, pyrithiobac-sodium, pyroxasulfone, quinclorac, quinmerac, quinoclamine, quinonamid, quizalofop, quizalofop-P, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfentrazone, sulfometuron, sulfosate, sulfosulfuron, sulfuric acid, sulglycapin, swep, TCA, tebutam, tebuthiuron, tefuryltrione, tembotrione, tepraloxydim, terbacil tcrbucarb, terbuchlor, terbumeton, terbuthylazine, terbutryn, tetrafluron, thenvlchlor, thiameturon, thiazafluron, thiazopyr, thidiazimin, thidiazuron, thiencarbazone-methyl, thifensulfuron, thifensulfuronmethyl, thiobencarb, tiafenacil, tiocarbazil, tioclorim, tolpyralate, topramezone, tralkoxydim, tri-allate, triafamone, triasulfuron, triaziflam, tribenuron, tribenuronmethyl, tridiphane, trietazine, trifloxysulfuron, trifludimoxazin, trifluralin, triflusulfuron, trifop, trifopsime, trihydroxytriazine, trimeturon, tripropindan, tritac, tritosulfuron, vernolate, xylachlor, salts, esters, optically active isomers, and mixtures thereof.

In some embodiments, the carrier is a liquid or solid carrier. In some embodiments, the carrier is an organic or inorganic carrier. Exemplary liquid carriers include, but are not limited to, petroleum fractions or hydrocarbons such as mineral oil, aromatic solvents, paraffinic oils, and the like or less, vegetable oils such as soybean oil, rapeseed oil, olive oil, castor oil, sunflower seed oil, coconut oil, corn oil cottonseed oil, linseed oil, palm oil, peanut oil, safflower oil, sesame oil, tung oil and the like or less, esters of the above vegetable oils or less, esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, dibutyl adipate, di-octyl phthalate and the like or less, esters of mono-, di-, and polycarboxylic acids and the like, toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide, liquid fertilizers and the like, and water as well as mixtures thereof. Exemplary solid carriers include, but are not limited to, silicas, silica gels, silicates, talc, kaolin, limestone, lime, chalk, bole, loess, clay, dolomite, diatomaceous earth, calcium sulfate, magnesium sulfate, magnesium oxide, ground synthetic materials, pyrophyllite clay, attapulgus clay, kieselguhr, calcium carbonate, bentonite clay, Fuller's earth, cottonseed hulls, wheat flour, soybean flour, pumice, wood flour, walnut shell flour, lignin, ammonium sulfate, ammonium phosphate, ammonium nitrate, ureas, cereal meal, tree bark meal, wood meal and nutshell meal, cellulose powders, and mixtures thereof.

In some embodiments, the second herbicide, the herbicidal safener, and/or the agriculturally acceptable adjuvant or carrier has low toxicity for mammals, fish, and microbes, and/or is biodegradable It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

The invention having been described, the following examples are offered to illustrate the subject invention by way of illustration, not by way of limitation.

Example 1

Rhizobacteria Mediate the Phytotoxicity of a Range of Biorefinery-Relevant Compounds Advances in synthetic biology and chemistry have expanded the list of renewable compounds that can be produced at scale via biological routes from plant biomass. In most cases, these chemical products have not been evaluated for effects on biological systems, defined here as bioactivity, that may be relevant to their manufacture. For sustainable chemical and fuel production, the industry needs to transition from fossil to renewable carbon sources, resulting in unprecedented expansion in the production and environmental distribution of chemicals used in biomanufacturing. Further, while some chemicals have been assessed for mammalian toxicity, environmental and agricultural hazards are largely unknown. Six compounds that are representative of the emerging biofuel and bioproduct pipeline are assessed for their effect on model plants (*Arabidopsis thaliana, Sorghum bicolor*) and show that several alter plant seedling physiology at sub-millimolar concentrations. However, these responses change in the presence of members of the *A. thaliana* root microbiome. Two individual microbes that change the effect of chemical treatment on root architecture, and a pooled microbial community with different effects relative to its constituents individually are identified. These findings indicate that screening industrial chemicals for bioactivity on model organisms in the presence of their microbiomes is important for biologically and ecologically relevant risk analyses.

Six chemicals relevant to the biofuel industry are selected and characterized their effects on *Arabidopsis* seedling development. Novel, unanticipated bioactivities in several industrially relevant compounds are identified, reinforcing the value of screening candidate chemicals for off-target effects. Members of the *Arabidopsis* core-rhizobiome (Lundberg et al. 2012) that represent phyla enriched in the endophytic compartment (i.e. within the root) are then used to test whether the effects of chemical treatment are altered by microbial inoculation. The effects on *Arabidopsis* to *Sorghum bicolor* (*sorghum*), a grain, biomass, and forage crop and a monocotyledon are then compared. These data indicate that root-associated microorganisms have a complex influence on the tolerance of a plant to a chemical stress; therefore, considering the native rhizobiome of crops will be important for ensuring accuracy in environmental chemical safety assessments.

Results

Development of an *Arabidopsis*-Based Screen for Bioactivity.

Six compounds are selected as representatives of the emerging bioenergy and biofuel industry (FIG. 1, Table 1). Protocatechuate (a precursor of nylon and polyethylene terephathalate) and p-coumarate (a precursor to high-value compounds such as resveratrol and other phenolics) are plant aromatics, overproduction of which in planta can enhance the value of the lignin fraction of biomass (Eudes, Zhao, et al. 2016; Eudes, Pereira, et al. 2016). Cholinium lysinate [Ch][Lys] and 1-ethyl-3-methylimidazoleum acetate [$C_2C_1$im][OAc] are ionic liquids (ILs) used to pretreat plant biomass to help liberate fermentable sugars and other valuable chemicals (Çetinkol et al. 2010, Sun et al. 2014). Lastly, α-pinene and D-limonene are potential bio-jet fuel precursors (Harvey, Wright, and Quintana 2010, Tracy et al. 2009) that can be produced using plant-derived sugars via microbial metabolism.

TABLE 1

Compounds tested, with proposed or known industrial applications.

| | Compound | Examples of uses in biomanufacturing |
|---|---|---|
| ① | protocatechuate | Phenolic which can be directly used by aromatic-consuming micro-organisms [Linger et al. 2014]. Biomass can be engineered to increase the content of protocatechuate e.g. [Eudes et al. 2015] |
| ② | p-coumarate | Phenolic which can be directly used by aromatic-consuming micro-organisms [Linger et al. 2014]. Biomass can be engineered to increase the content of p-coumarate e.g. [Li et al. 2018] |
| ③ | cholinium lysinate [CH][Lys] | Bio-compatible ionic liquid that can be used in the deconstruction of plant biomass e.g. [Sun et al. 2014] |
| ④ | 1-ethyl-3-methylimidazolium acetate [$C_1C_2$im][OAc] | Ionic liquid that can be used in the deconstruction of plant biomass e.g. [Sun et al. 2014] |
| ⑤ | α-pinene | Terpene that is a bio-gasoline candidate, a fragrance, and a component of cleaning products e.g. [Harvey et al. 2010] |
| ⑥ | D-limonene | Terpene that is a bio-jet fuel candidate, a fragrance and a component of cleaning products e.g. [Tracy et al. 2009] |

Circled numbers refer to the process described in FIG. 1.

An initial dose-responded for *Arabidopsis* seeding growth across multiple orders of magnitude in concentration is developed, and then examined sub-lethal concentrations in greater detail. Plants are germinated and grown vertically on transparent agar plates until the emergence of the first set of true leaves (6-8 days), transferred to fresh plates with or without the compound of interest, and imaged at 0 and 6 days after transfer. Finally, a semi-automated image analysis method is used to score primary root growth and total lateral root number, common phenotypes in plant developmental biology (Lobet, Pagès, and Draye 2011).

*Arabidopsis* Root Architecture is Sensitive to Biofuel-Related Compounds.

Figure 2A:
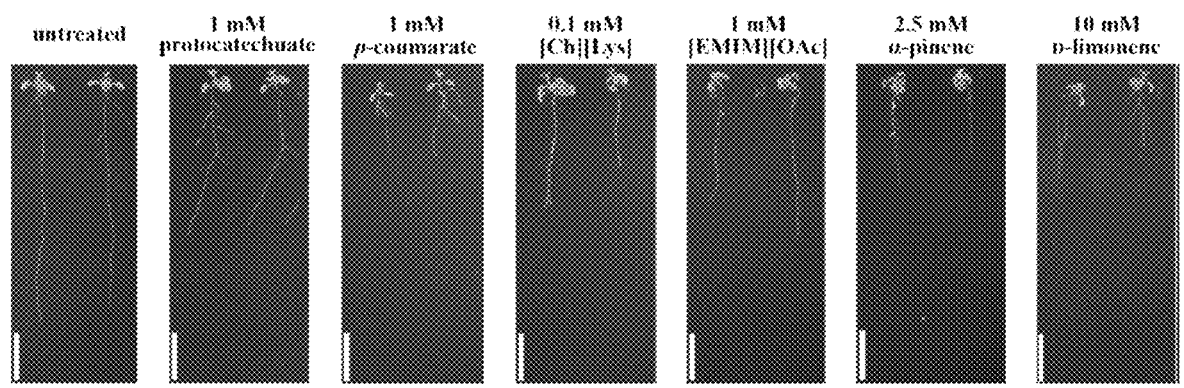
FIG. 2A. A screen of biofuel-related compounds reveals distinct effects on *Arabidopsis* root architecture. Representative images of *Arabidopsis* plants 6 days after transfer to test (containing the chemical) or control media. Scale bar=1 cm.
Figure 2B:
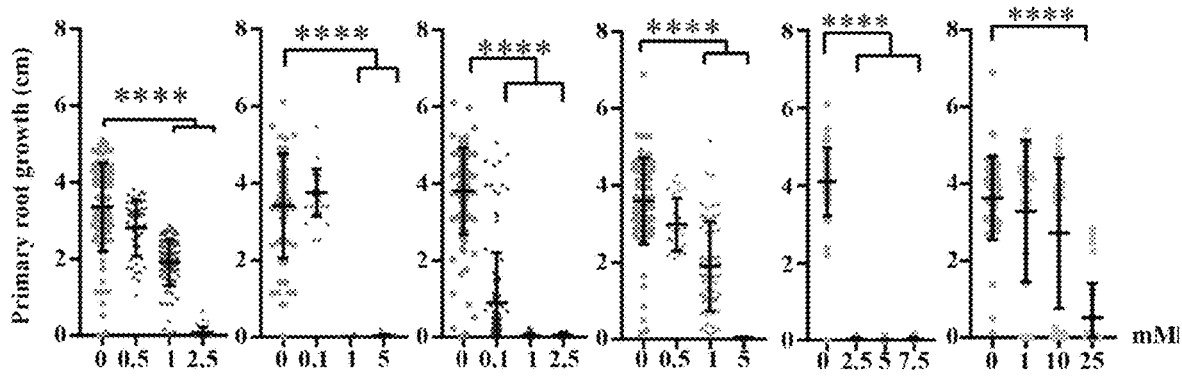
FIG. 2B. A screen of biofuel-related compounds reveals distinct effects on *Arabidopsis* root architecture. Primary root growth after 6 days of treatment. *, , *, and **** represent P<0.05, <0.01, <0.001, and <0.0001 (Kruskal-Wallis), n>21.
Figure 2C:
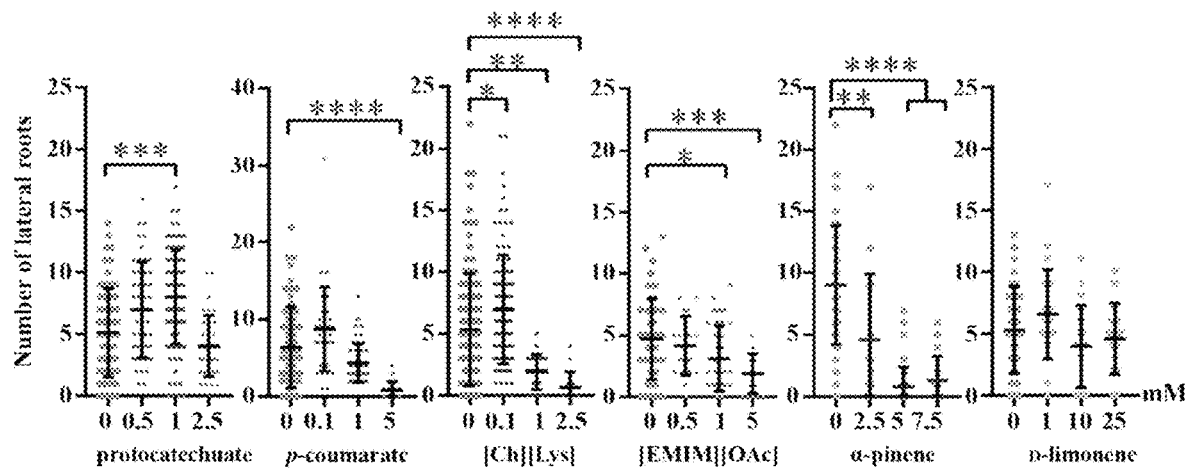
FIG. 2C. A screen of biofuel-related compounds reveals distinct effects on *Arabidopsis* root architecture. Lateral root number after 6 days of treatment. Scale bar=1 cm. *, , *, and **** represent P<0.05, <0.01, <0.001, and <0.0001 (Kruskal-Wallis), n>21.

Three of the selected compounds, p-coumarate, [$C_2C_1$im][OAc], and α-pinene, cause a dose dependent reduction in primary root growth and lateral root initiation (FIGS. 2A to 2C). Protocatechuate and [Ch][Lys] reduce primary root growth at all concentrations tested but increase lateral root initiation at 1 mM and 0.1 mM, respectively. Protocatechuate also cause changes to primary root curvature at 1 mM, resulting in a median skew 200 to the right from that of untreated plants (p<0.0001, SE=10.78°, FIGS. 2A to 2C). D-limonene cause inconsistent changes in root architecture both between and within plates: at least 20% of plants showed complete inhibition of primary root growth regardless of the concentration tested (Fig. FIGS. 2A to 2C). The response of lateral root initiation is less consistent. For example, lateral root growth is enhanced by protocatechuate treatment, but unaffected by limonene treatment (Fig. FIGS. 2A to 2C).

Rhizobacteria Alter *Arabidopsis* Root Architecture.

Figure 3A:
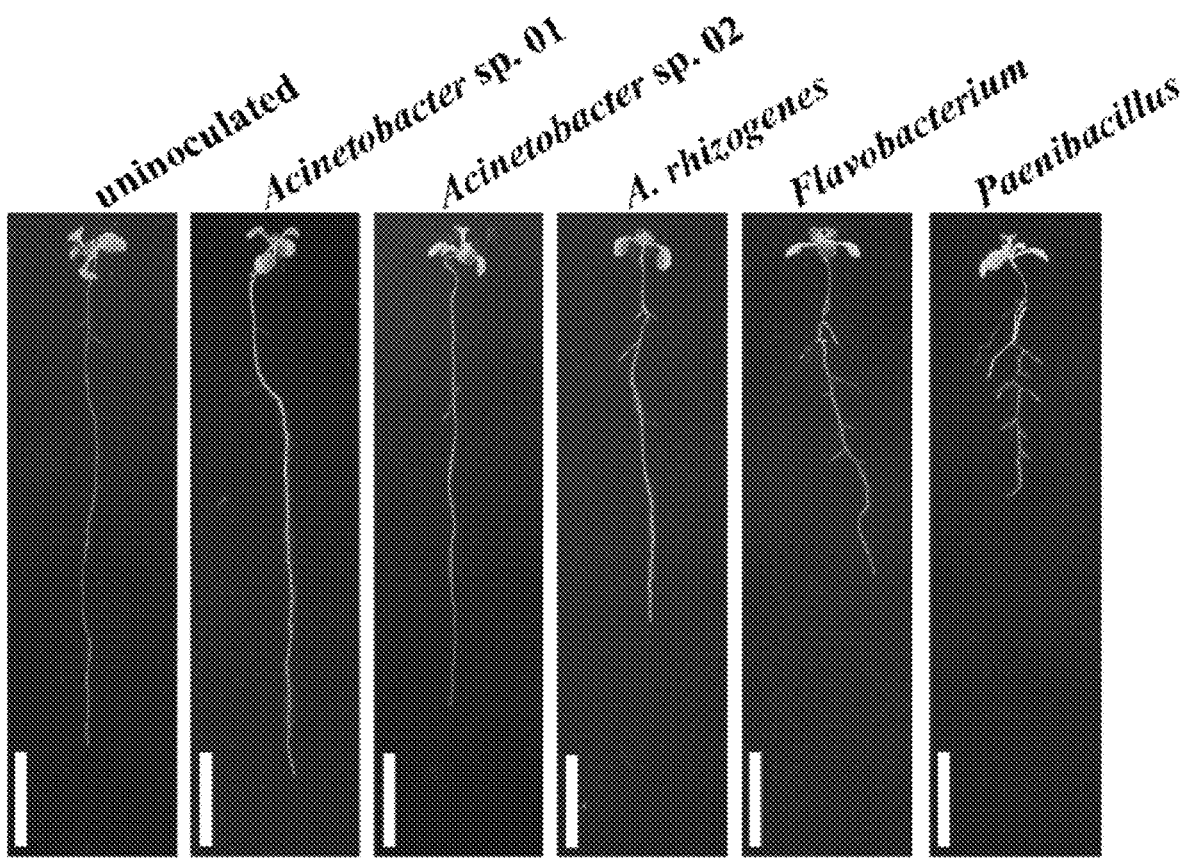
FIG. 3A. Inoculation with individual rhizobacterium influences *Arabidopsis* root architecture. Representative images of *Arabidopsis* 6 days after inoculation. Scale bar=1 cm.
Figure 3B:
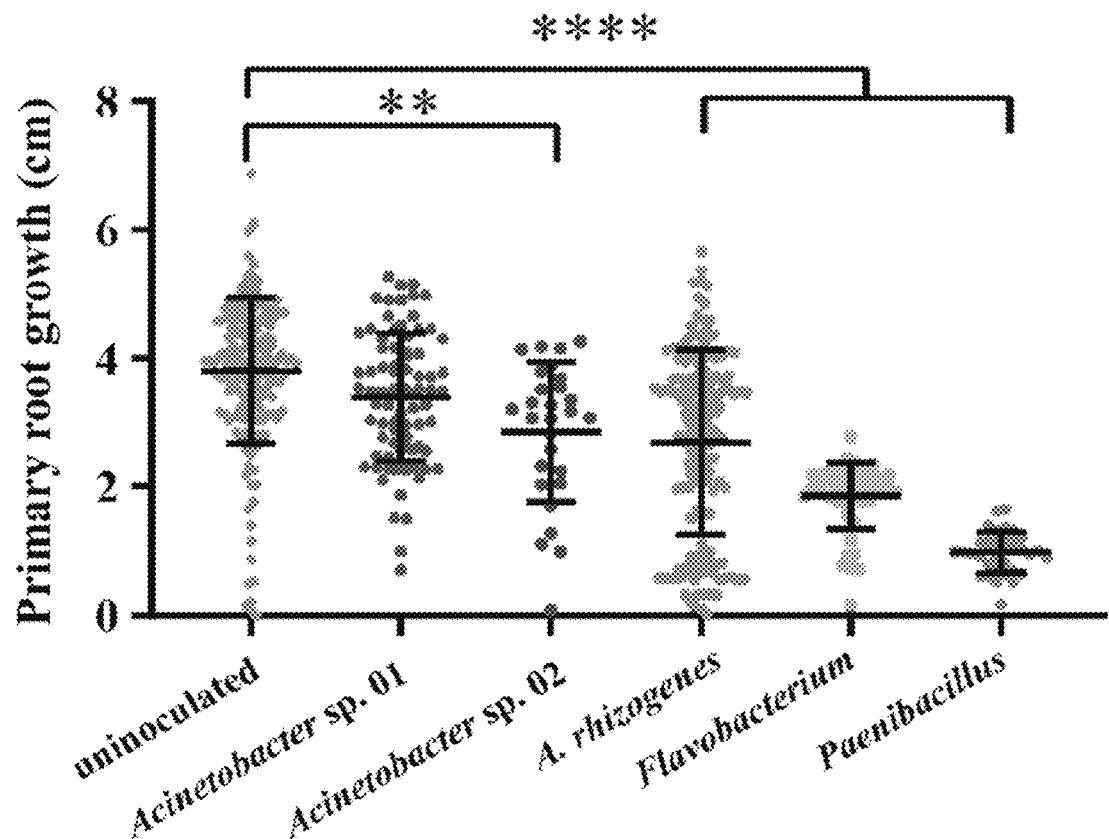
FIG. 3B. Inoculation with individual rhizobacterium influences *Arabidopsis* root architecture. Primary root growth 6 days after inoculation. See Table 2 for details of microbes. *, , *, and **** represent P<0.05, <0.01, <0.001, and <0.0001 (Kruskal-Wallis), n>21.
Figure 3C:
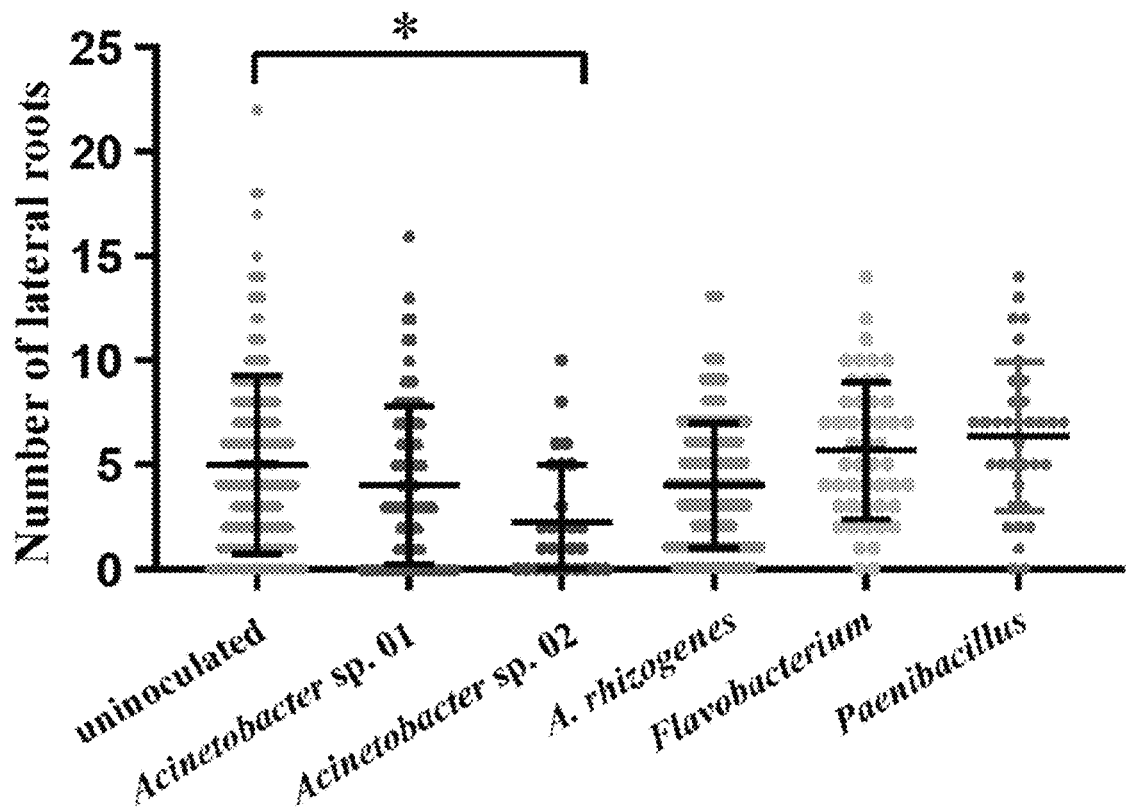
FIG. 3C. Inoculation with individual rhizobacterium influences *Arabidopsis* root architecture. Lateral root number 6 days after inoculation. See Table 2 for details of microbes. *, , *, and **** represent P<0.05, <0.01, <0.001, and <0.0001 (Kruskal-Wallis), n>21.

Next, the effects of individual rhizobacteria on root architecture are tested. 14 strains from representative phyla (Table 2) previously described as enriched in the endophytic compartment of *Arabidopsis* (Lundberg et al. 2012; Levy et al. 2018) are selected for an initial screen. After the emergence of true leaves, *Arabidopsis* roots are inoculated with cell resuspensions of microbes or mock-treated with water alone (control), then transferred to fresh agar plates. Each microbe is screened individually for effects on root architecture and quantified changes where they were visually apparent (FIG. 3A).

TABLE 2

Summary of microbes used in the study.

| Microbe | NCBI Taxonomy ID |
|---|---|
| *A. rhizogenes* | 2521172625 |
| *Acinetobacter* sp. 01 | 2593339129 |
| *Acinetobacter* sp. 02 | 2643221500 |
| *Acinetobacter* sp. 03 | 2556921674 |
| *Arthrobacter* sp. | 2517572124 |
| *Bacillus flexus* | 2522125133 |
| *Brevundimonas* sp. | 2596583649 |
| *Burkholderia* sp. | 2593339266 |
| *Chryseobacterium* sp. | 2529292577 |
| *Flavobacterium* sp. | 2563366720 |
| *Leifsonia* sp. | 2522572063 |
| *Paenibacillus* sp. | 2563366513 |
| *Ralstonia* sp. | 2558309150 |
| *Rhodococcus erythropolis* | 2643221496 |

Most candidate microbes do not significantly alter root growth, however five have strong effects. The primary roots of plants inoculated with two *Acinetobacter* species (sp. 02 and sp. 03) are shorter than controls (Mean$_{Control}$=3.780 cm; Mean$_{sp.02}$=2.85 cm, SEM=0.205, p=0.005; Mean$_{sp.03}$=3.021 cm, SEM=0.140, p=0.004) and initiated fewer lateral roots (Mean$_{Control}$=4.99; Mean$_{sp.02}$=2.25, SEM=0.519, p=0.007; Mean$_{sp.03}$=2.629, SEM=0.444, p=0.034). A third microbe, *Acinetobacter* sp. 01, does not have a significant effect on root architecture, suggesting that the effects of sp. 02 and sp. 03 are specific to those strains and not a general effect of the genus. In contrast, plants inoculated with *A. rhizogenes*, *Flavobacterium* sp., or *Paenibacillus* sp., grow shorter primary roots (Mean$_{Control}$=3.780 cm, Mean$_{rhizogenes}$=2.693 cm, SEM=0.116, p<0.0001; Mean$_{Flavobacterium}$=1.854 cm, SEM=0.073, p<0.0001 Mean$_{Paenibacillus}$=0.972 cm, SEM=0.054, p<0.0001) but do not differ in lateral root initiation. *Flavobacterium* sp. and *Paenibacillus* sp. cause the greatest effect; reducing mean (+SE) primary root growth to 48.7%+0.19 and 25.5%+1.4 of mock-inoculated controls, respectively. Inoculation with *Flavobacterium* sp. or *Paenibacillus* sp. also reduce the zone of primary root elongation, defined here as the distance from the root apical meristem to the closest visible lateral root (Mean$_{Control}$=3.13 cm; Mean$_{Flavobacterium}$=1.23 cm, SEM=0.077, p<0.0001; Mean$_{Paenibacillus}$=0.40 cm, SEM=0.049, p<0.0001), facilitating lateral root initiation along a larger percentage of the primary root despite reduced primary root growth overall, thereby increasing lateral root density relative to controls (MeanControl=0.714 lateral roots/cm primary root length; Mean$_{Flavobacterium}$=1.488 roots/cm, SEM=0.124, p<0.0001; Mean$_{Paenibacillus}$=0.3163 roots/cm, SEM=0.186, p<0.0001). *A. rhizogenes* reduce the primary root elongation zone but do not significantly increase lateral root density.

Specific Rhizobacteria Change the Bioactivity of the Selected Compounds.

Figure 4A:
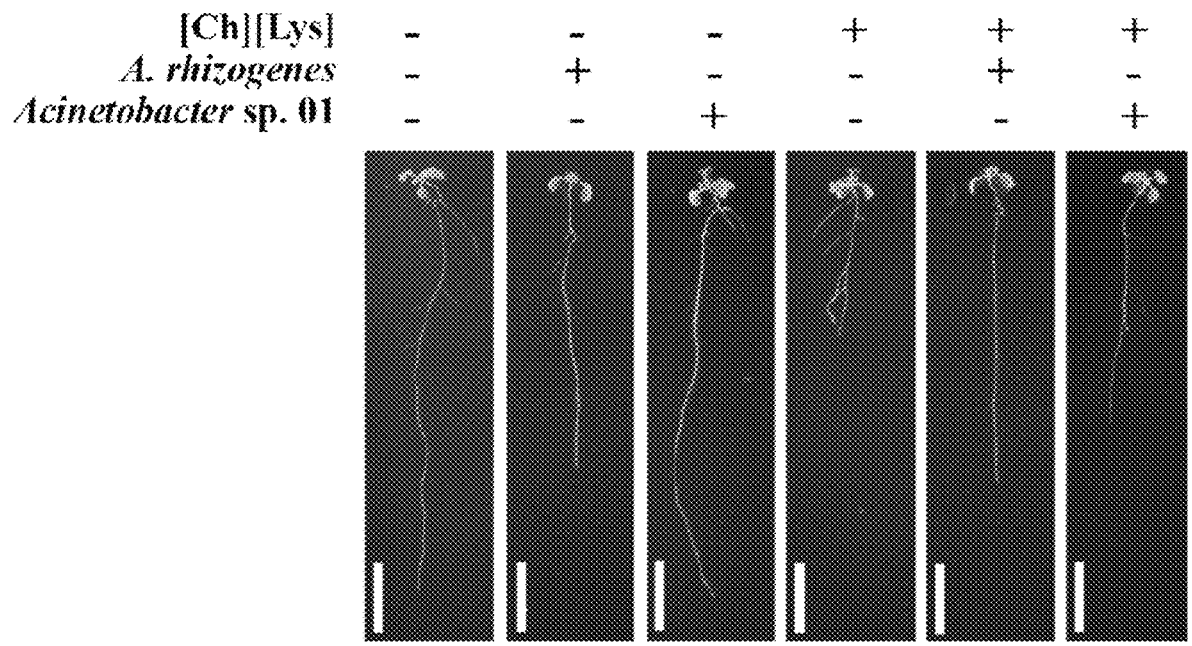
FIG. 4A. Inoculation with select rhizobacteria ameliorates ionic liquid toxicity in *Arabidopsis*. Representative images of *Arabidopsis* 6 days after 0.1 mM [Ch][Lys] treatment and/or bacterial inoculation. The scale bar=1 cm.
Figure 4B:
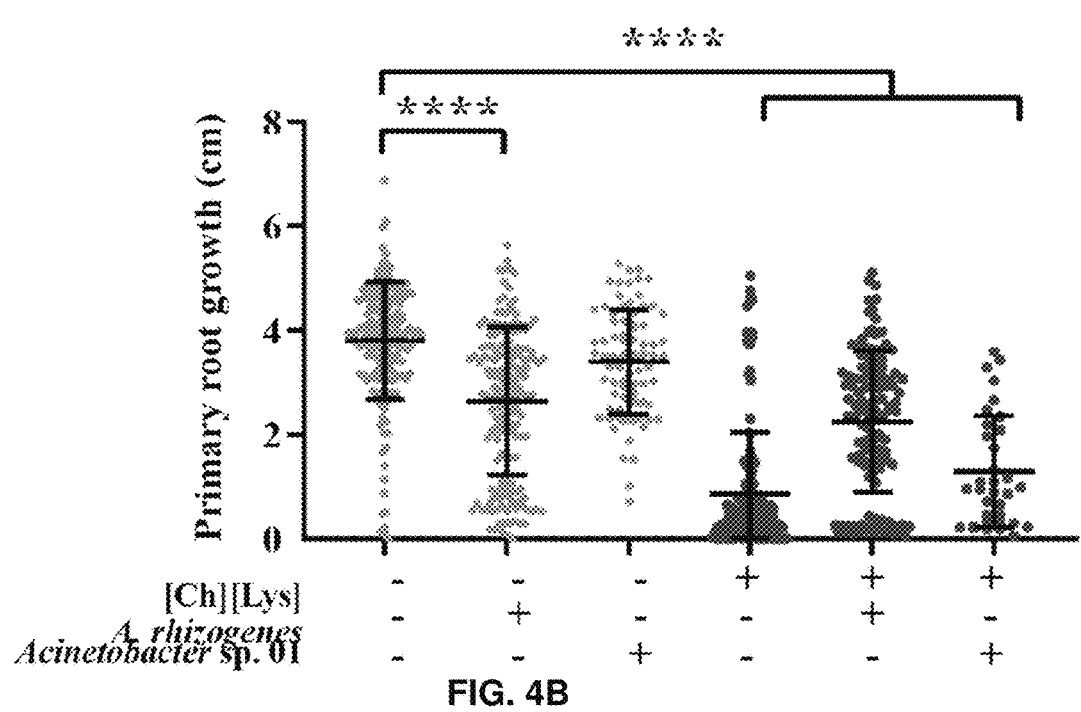
FIG. 4B. Inoculation with select rhizobacteria ameliorates ionic liquid toxicity in *Arabidopsis*. Primary root growth 6 days after 0.1 mM [Ch][Lys] treatment and/or bacterial inoculation. Chemical treatment- or root inoculation-only controls from FIGS. 2A to 2C and FIGS. 3A to 3C respectively, have been repeated here for clarity. *,  and ** represent P<0.05, <0.01, <0.001, and <0.0001 (Kruskal-Wallis), n>21.
Figure 4C:
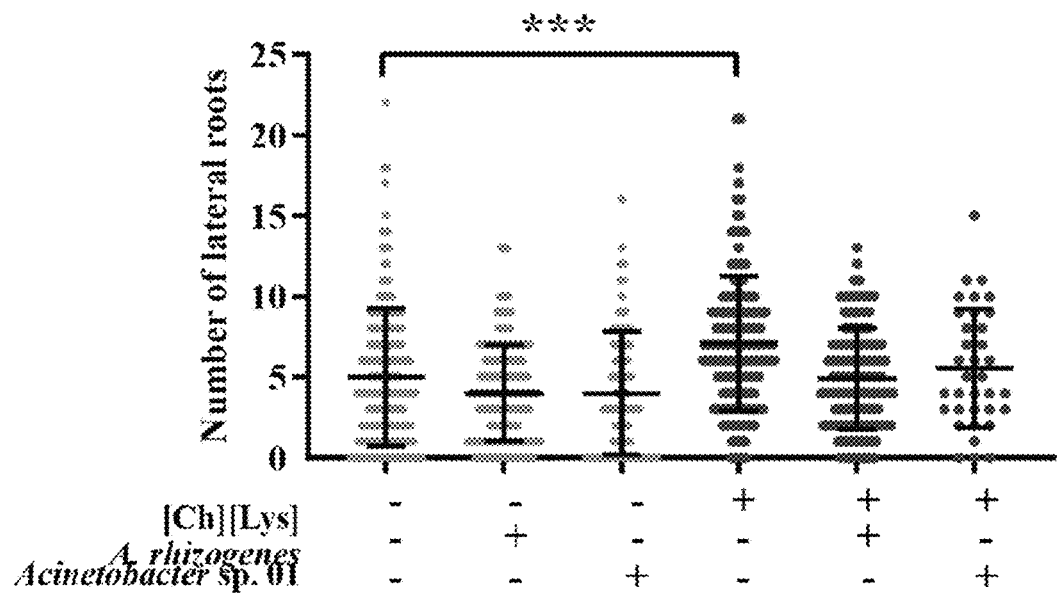
FIG. 4C. Inoculation with select rhizobacteria ameliorates ionic liquid toxicity in *Arabidopsis*. Lateral root number 6 days after 0.1 mM [Ch][Lys] treatment and/or bacterial inoculation. Chemical treatment- or root inoculation-only controls from FIGS. 2A to 2C and FIGS. 3A to 3C respectively, have been repeated here for clarity. *, , *, and **** represent P<0.05, <0.01, <0.001, and <0.0001 (Kruskal-Wallis), n>21.
Figure 4D:
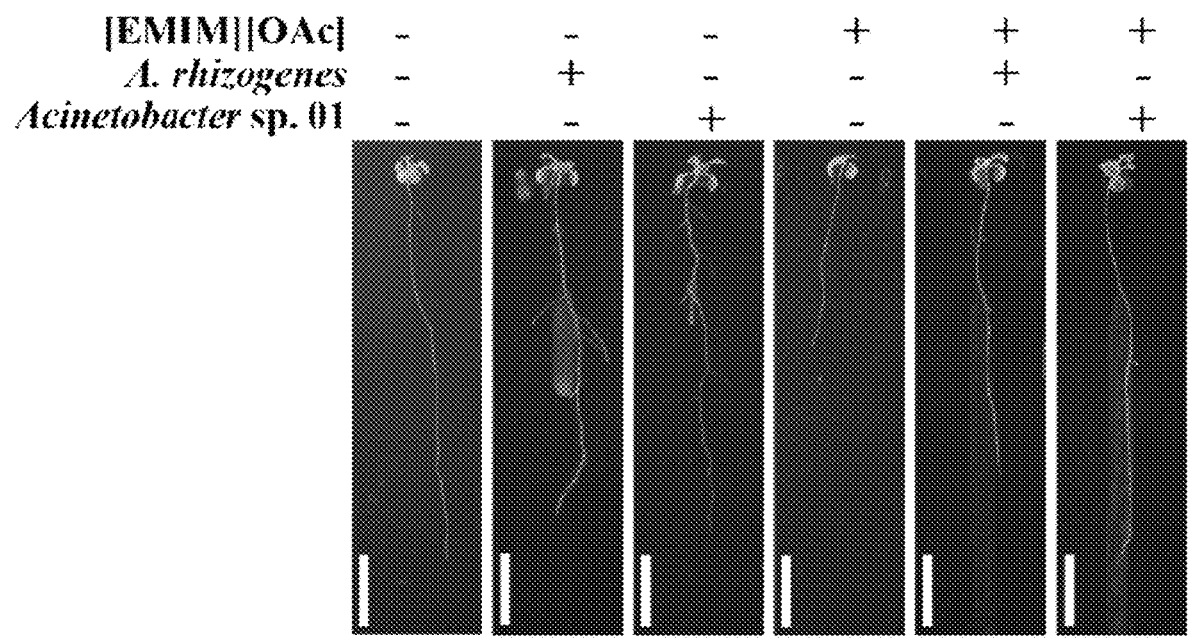
FIG. 4D. Inoculation with select rhizobacteria ameliorates ionic liquid toxicity in *Arabidopsis*. Representative images of *Arabidopsis* 6 days after 1 mM [$C_2C_1$im][OAc] treatment and/or bacterial inoculation. The scale bar=1 cm.
Figure 4E:
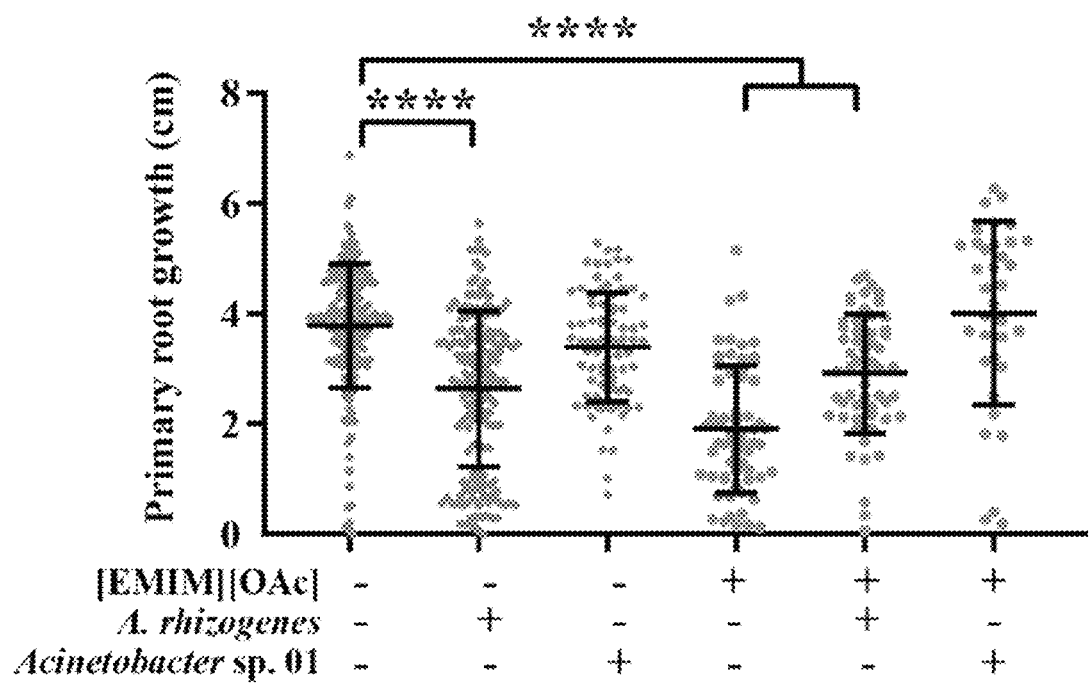
FIG. 4E. Inoculation with select rhizobacteria ameliorates ionic liquid toxicity in *Arabidopsis*. Primary root growth 6 days after 1 mM [$C_2C_1$im][OAc] treatment and/or bacterial inoculation. Chemical treatment- or root inoculation-only controls from FIGS. 2A to 2C and FIGS. 3A to 3C respectively, have been repeated here for clarity. *, , *, and **** represent P<0.05, <0.01, <0.001, and <0.0001 (Kruskal-Wallis), n>21.
Figure 4F:
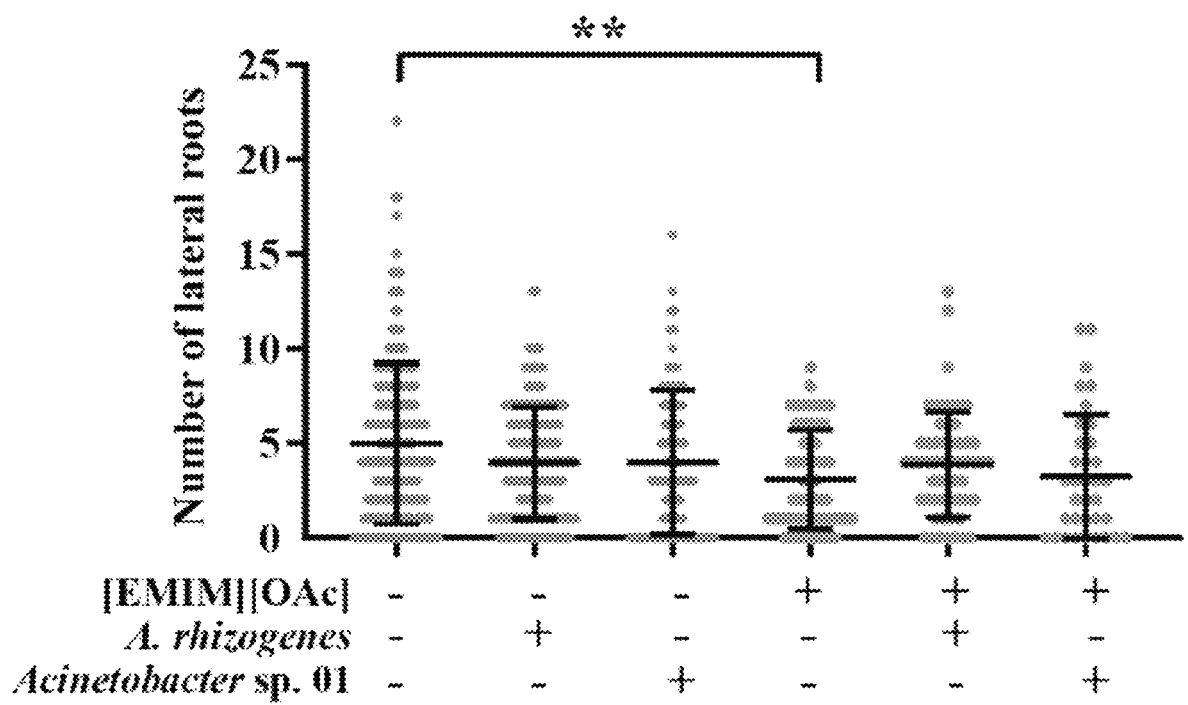
FIG. 4F. Inoculation with select rhizobacteria ameliorates ionic liquid toxicity in *Arabidopsis*. Lateral root number 6 days after 1 mM [$C_2C_1$im][OAc] treatment and/or bacterial inoculation. Chemical treatment- or root inoculation-only controls from FIGS. 2A to 2C and FIGS. 3A to 3C respectively, have been repeated here for clarity. *, , *, and **** represent P<0.05, <0.01, <0.001, and <0.0001 (Kruskal-Wallis), n>21.
Figure 4G:
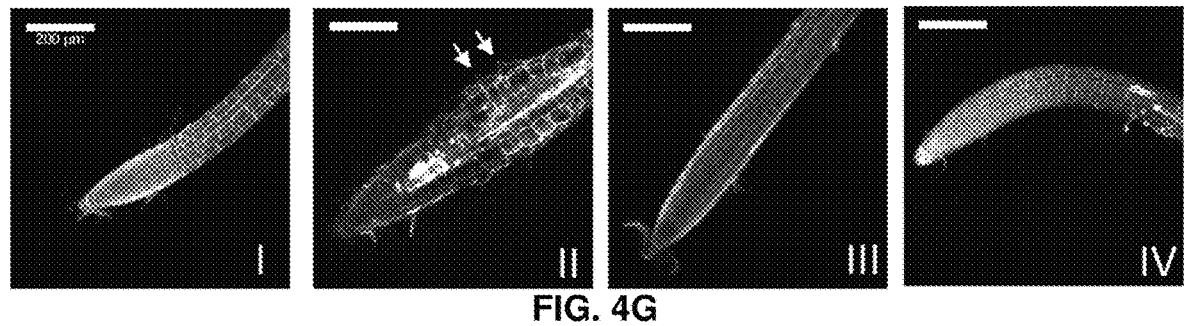
FIG. 4G. Inoculation with select rhizobacteria ameliorates ionic liquid toxicity in *Arabidopsis*. Representative fluorescent microscopy images of *Arabidopsis* roots following propidium iodide staining. I: Control; II: 0.1 mM [Ch][Lys]; III: inoculation with *A. rhizogenes*; IV: 0.1 mM [Ch][Lys] and *A. rhizogenes*. The scale bar=200 µm. Arrows indicate the ectopic formation of root hairs.

Whether inoculation with rhizobacteria alters the effect of the test compounds on plant growth is next tested. Two microbes, *A. rhizogenes* and *Acinetobacter* sp. 01, which are tolerant of 10 mM [Ch][Lys], as compared to 0.1 mM [Ch][Lys] which significantly inhibit the primary root growth of *Arabidopsis*, are chosen (FIGS. 2A to 2C, FIGS. 4A to 4G). Treatment of uninoculated plants with 0.1 mM [Ch][Lys] decreased primary root growth and increase lateral root initiation (FIGS. 3A to 3C, FIGS. 4A to 4G). Inoculation with *A. rhizogenes*, prior to [Ch][Lys] treatment restore primary root growth (FIGS. 4A to 4G; Mean$_{[Ch][Lys]}$=0.858 cm; Mean$_{[Ch][Lys]/rhizogenes}$=2.241 cm, SEM=0.158, p<0.0001) and lateral root initiation (Mean$_{[Ch][Lys]}$7.069; Mean$_{[Ch][Lys]/rhizogenes}$=4.889, SEM=0.47, p<0.0001) relative to uninoculated controls. In contrast, *Acinetobacter* sp. 01 has no significant effect on root growth regardless of [Ch][Lys] treatment. The effects of inoculation with *A. rhizogenes* is also evident microscopically (FIG. 4G): treatment with 0.1 mM [Ch][Lys] causes irregular expansion of epidermal cells of the root apical meristem (RAM) and stimulates formation of ectopic root hairs in epidermal cells immediately adjacent to the root cap (FIG. 4G, II). This phenotype is abolished in the *A. rhizogenes* treated roots (FIG. 4G, IV).

While different ILs do not affect plants in the same way—as illustrated by the differences between [Ch][Lys] and [C$_2$C$_1$im][OAc] (FIGS. 2A to 2C)—they share similar chemical properties as salts. Since improved plant salt tolerance is a known effect of some rhizobacteria (Mayak, Tirosh, and Glick 2004; Pinedo et al. 2015; Huang et al. 2017) it is hypothesized these microbes may have similar effects on plant phenotypes caused by [C$_2$C$_1$im][OAc] exposure. The effect of 1 mM [C$_2$C$_1$im][OAc], a concentration that does not alter the growth of either microbe, is tested. While 1 mM [C$_2$C$_1$im][OAc] causes an overall reduction in root growth (FIGS. 2A to 2C, FIGS. 4A to 4G), *A. rhizogenes* restores both primary root growth (FIGS. 4A to 4G; Mean$_{[C2C1im][OAc]}$=1.904 cm; Mean$_{[C2C1im][OAc]/rhizogenes}$=2.912, SEM=0.228, p=0.0002) but has no effect on lateral root initiation. Despite having no effect on [Ch][Lys] treatment, *Acinetobacter* sp. 01 completely restores primary root growth (Mean$_{[C2C1im][OAc]}$=1.904 cm; Mean$_{[C2C1im][OAc]/sp.01}$=4.011, SEM=0.261, p<0.0001). Both rhizobacteria tested are therefore capable of mediating the bioactivity of the test IL compounds.

It is possible that the microbes mediate the effects of these ILs by simply metabolizing them, thereby removing them from the environment around the root. Whether either [Ch][Lys] or [C$_2$C$_1$im][OAc] has an effect on *A. rhizogenes* is tested by growing a liquid culture in minimal media (M9, which contains only salts and nitrogen) supplemented with either 0.1 mM [Ch][Lys], 1 mM [C$_2$C$_1$im][OAc], or 1% w/v dextrose as the sole carbon source is tested. Neither IL allows microbial growth at these concentrations.

Alternatively, one or both ions of the IL could be sequestered or altered by the microbe in a process that does not directly impact cell growth. Choline, for instance, can be used as a precursor to the compatible solute glycine betaine in a process dependent on two genes, betA and betB, both of which are present in the *A. rhizogenes* genome (Levy et al. 2018). Glycine betaine is additionally known to improve the salt tolerance of both plants and microbes (Riou and Le Rudulier 1990; Hayashi et al. 1997). Therefore, whether [Ch][Lys] improves the salt tolerance of *A. rhizogenes* by growing the microbe in M9 supplemented with 1% w/v dextrose and either 0.1 mM [Ch][Lys], 400 mM NaCl, or both, is tested. NaCl reduces the *A. rhizogenes* growth rate, and this is partially rescued by the addition of [Ch][Lys].

Notably, the microbes do not always ameliorate the effects of the tested compounds. For example, when *Arabidopsis* is inoculated with *A. rhizogenes* and grown in the presence of 1 mM protocatechuate, this results in a more severe growth phenotype in which both primary root growth ($Mean_{protocatechuate}$=2.293 cm; $Mean_{protocatechuate/rhizogenes}$=0.631, SEM=0.201, p<0.0001) and lateral root initiation ($Mean_{protocatechuate}$=7.989; $Mean_{protocatechuate/rhizogenes}$=2.214, SEM=0.674, p<0.0001) are almost completely inhibited.

Specific Members of a Microbial Consortium Alter the Effect on Plant Chemical Tolerance.

Figure 5A:
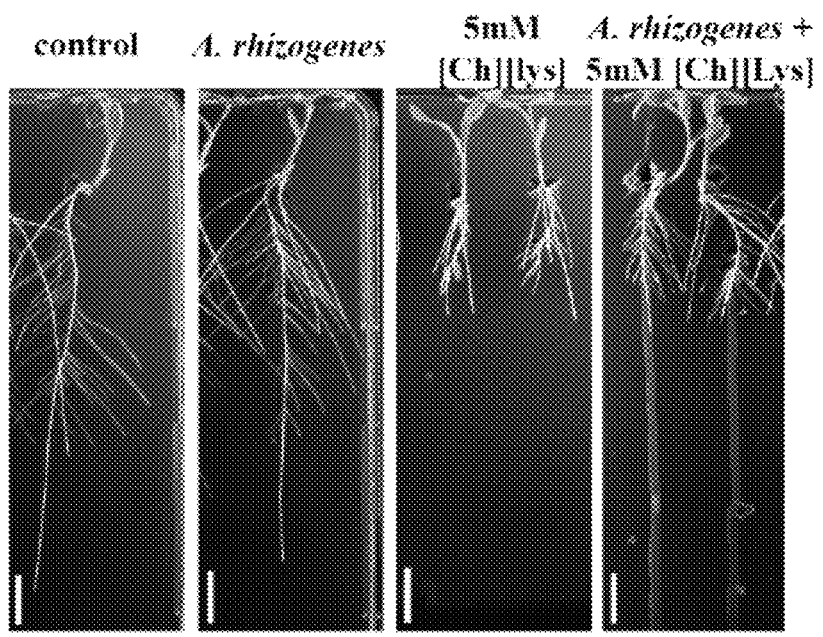
FIG. 5A. Composition of a reduced rhizobacterial community controls restoration of root growth under [Ch][Lys] stress. Representative images of *Arabidopsis* 6 days after 0.1 mM [Ch][Lys] treatment and/or inoculation with either the 14-member rhizobacterial pool (Pool A) or the same pool without *Flavobacterium* sp. and *Paenibacillus* sp. (Pool B). Scale bar=1 cm.
Figure 5B:
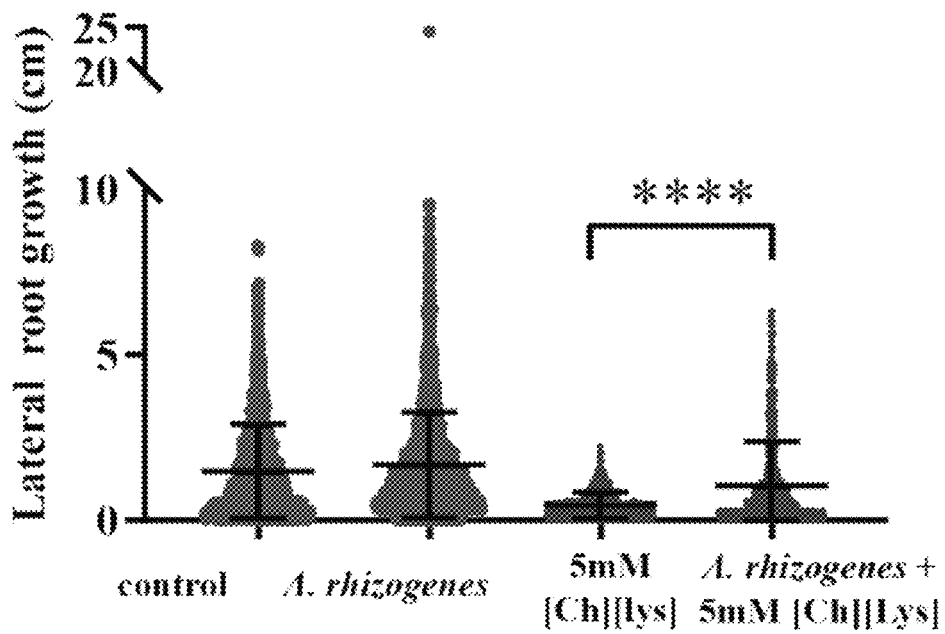
FIG. 5B. Composition of a reduced rhizobacterial community controls restoration of root growth under [Ch][Lys] stress. Primary root growth 6 days after 0.1 mM [Ch][Lys] treatment and/or inoculation with either the 14-member rhizobacterial pool (Pool A) or the same pool without *Flavobacterium* sp. and *Paenibacillus* sp. (Pool B). In (b) and (c) chemical treatment- or root inoculation-only controls, from FIGS. 2A to 2C and FIGS. 3A to 3C respectively, have been repeated here for clarity. *,  and ** represent P<0.05, <0.01, <0.001, and <0.0001 (Kruskal-Wallis), n>21.
Figure 5C:
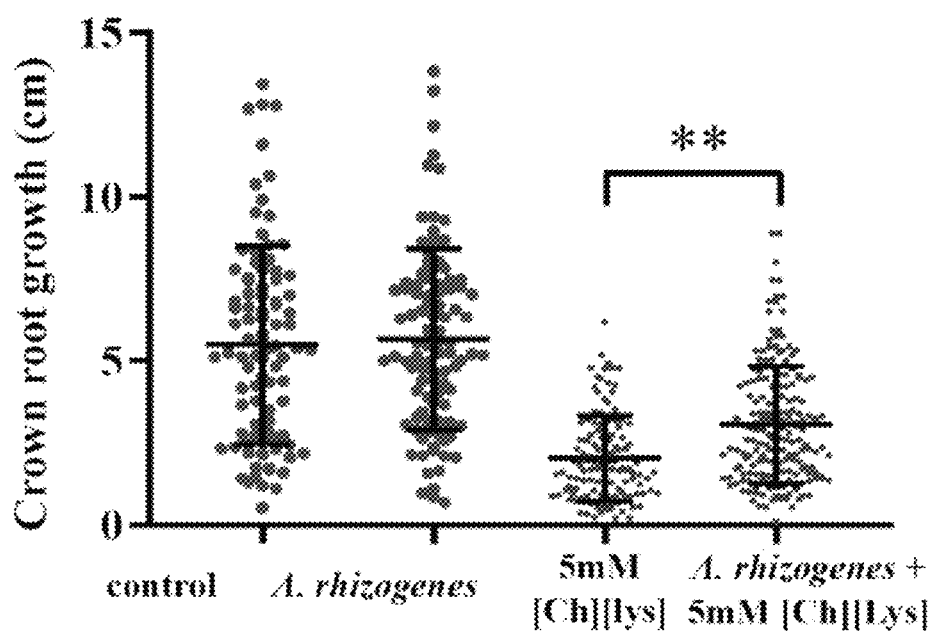
FIG. 5C. Composition of a reduced rhizobacterial community controls restoration of root growth under [Ch][Lys] stress. Lateral root number 6 days after 0.1 mM [Ch][Lys] treatment and/or inoculation with either the 14-member rhizobacterial pool (Pool A) or the same pool without *Flavobacterium* sp. and *Paenibacillus* sp. (Pool B). In (b) and (c) chemical treatment- or root inoculation-only controls, from FIGS. 2A to 2C and FIGS. 3A to 3C respectively, have been repeated here for clarity. *, , *, and **** represent P<0.05, <0.01, <0.001, and <0.0001 (Kruskal-Wallis), n>21.
Figure 6A:
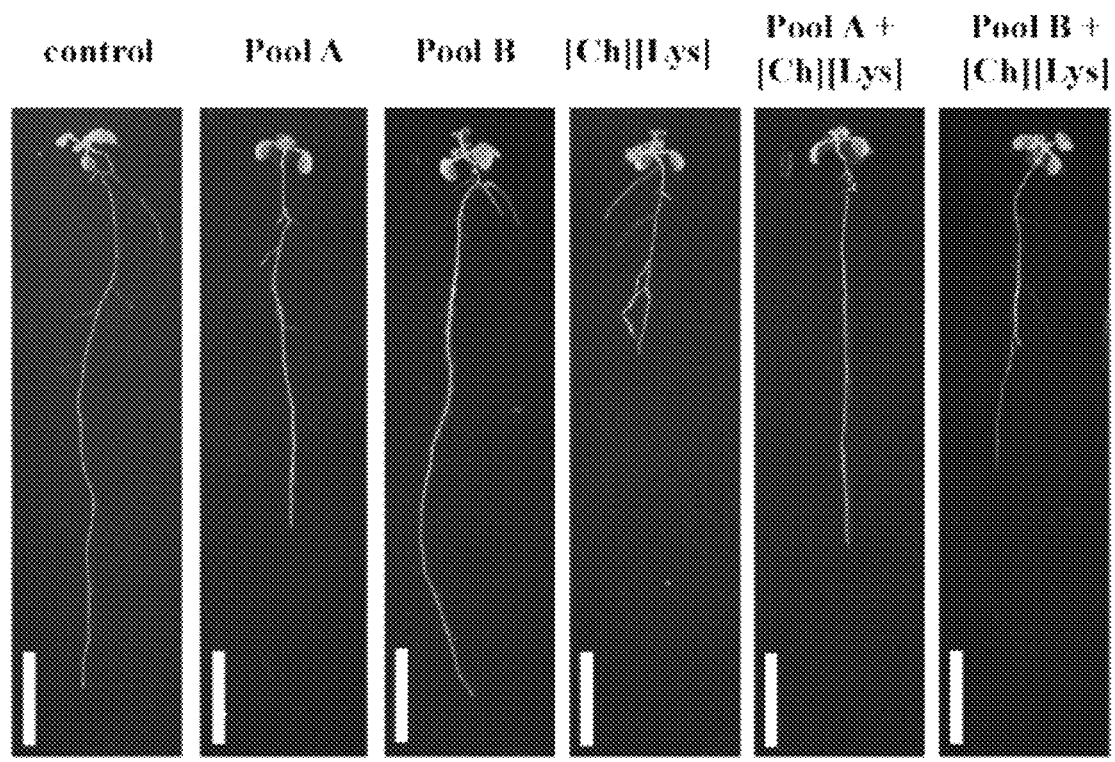
FIG. 6A. *A. rhizogenes* partially restores root growth of [Ch][Lys]-treated *sorghum*. Representative images 8 days after [Ch][Lys] treatment and/or *A. rhizogenes* inoculation. Scale bar=2 cm.
Figure 6B:
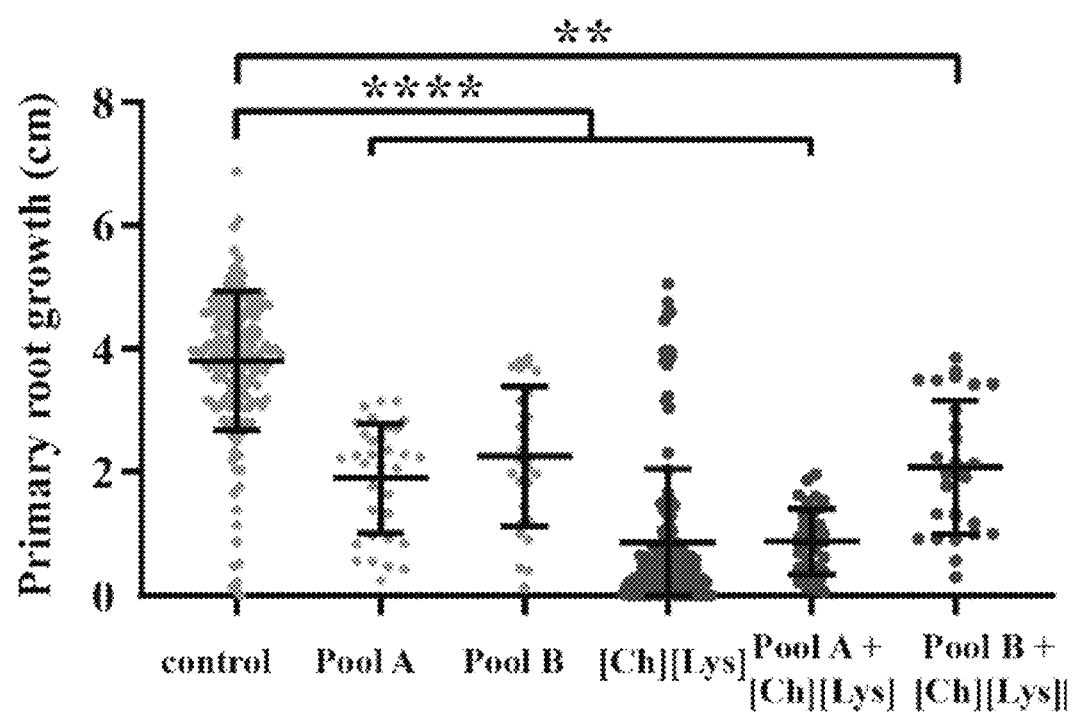
FIG. 6B. *A. rhizogenes* partially restores root growth of [Ch][Lys]-treated *sorghum*. Sorghum lateral root growth 8 days after [Ch][Lys] treatment and/or *A. rhizogenes* inoculation. *, , *, and **** represent P<0.05, <0.01, <0.001, and <0.0001 (Kruskal-Wallis), n>30.
Figure 6C:
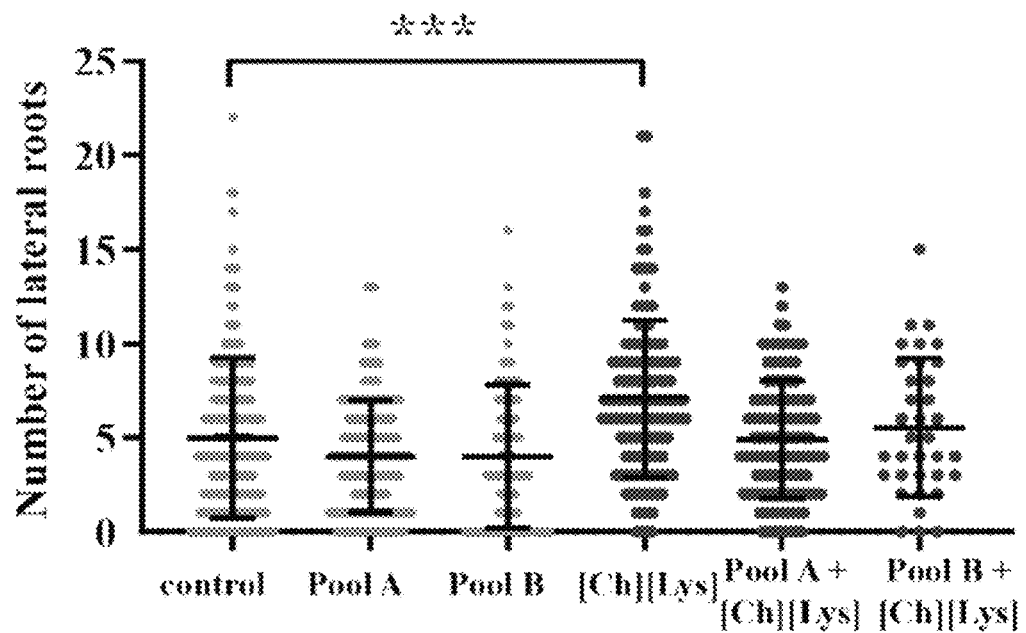
FIG. 6C. *A. rhizogenes* partially restores root growth of [Ch][Lys]-treated *sorghum*. Crown root growth 8 days after [Ch][Lys] treatment and/or *A. rhizogenes* inoculation. *, , *, and **** represent P<0.05, <0.01, <0.001, and <0.0001 (Kruskal-Wallis), n>30.

Finally, the effects of combining all 14 rhizobiome members on *Arabidopsis* root growth in the presence of [Ch][Lys] is tested. Resuspensions of the 14 rhizobacteria are pooled together (Pool A), reducing the concentrations of each individual microbe to give an equivalent total inoculum as for previous experiments. Pool A decreases primary root growth ($Mean_{Control}$=3.8 cm; $Mean_{PoolA}$=1.895 cm, SEM=0.202, p<0.0001) and increases the number of lateral roots ($Mean_{Control}$=4.9; $Mean_{PoolA}$=7.543, SEM=0.735, p=0.0071) relative to uninoculated controls (FIGS. 6A to 6C). Because it has previously been observed that *Flavobacterium* sp. and *Paenibacillus* sp. reduce the primary root growth of *Arabidopsis* by 50% or more (FIGS. 3A to 3C), an additional pool excluding *Flavobacterium* sp. and *Paenibacillus* sp. (Pool B) is tested. Pool B also reduces primary root growth in the absence of chemical treatment ($Mean_{Control}$=3.8 cm; $Mean_{PoolB}$=2.251 cm, SEM=0.222, p<0.0001) but have no effect on lateral root initiation (FIGS. 6A to 6C). Whether the pooled communities can mitigate the effects of [Ch][Lys] is then tested. When treated with 0.1 mM [Ch][Lys], plants inoculated with Pool A do not differ significantly from uninoculated, [Ch][Lys]-treated controls (FIGS. 5A to 5C). Inoculation with Pool B, however, partially restores primary root growth ($Mean_{[Ch][Lys]}$=0.858 cm; $Mean_{PoolB}$=2.072 cm, SEM=0.227, p<0.0001). Therefore, while the consortium is capable of mediating [Ch][Lys] tolerance in *Arabidopsis*, the presence of *Flavobacterium* sp., *Paenibacillus* sp., or both repress this effect.

*A. rhizogenes* Increases Tolerance to [Ch][Lys] in *Sorghum*.

*Arabidopsis* is useful as a model system because of its fast generation time, ease of handling, and the availability of relevant genetic tools. The effects of these treatments on a second plant species of economic relevance are compared. *Sorghum* is selected, since it is both evolutionarily distant from *Arabidopsis*, but also an agronomically important plant for food, forage, and biomass, and is cultivated over 3,300,000 ha in the United States and 40,000,000 ha globally (Langholtz, Stokes B. J., and Eaton 2016). [Ch][Lys] treatment and inoculation with *A. rhizogenes* on *sorghum* using a similar vertical growth system using larger agar plates is tested. No change in *sorghum* root architecture when inoculated with *A. rhizogenes* alone is observed (FIGS. 6A to 6C). Treatment with 5 mM [Ch][Lys] is sufficient to almost completely inhibit branching lateral roots and crown root growth over 8 days. Both lateral root growth ($Mean_{[Ch][Lys]}$=0.464 cm; $Mean_{[Ch][Lys]/rhizogenes}$=1.051 cm, SEM=0.075, p<0.0001) and crown root growth (($Mean_{[Ch][Lys]}$=3.267 cm; $Mean_{[Ch][Lys]/rhizogenes}$=5.028 cm, SEM=0.4535, p=0.001) is partially restored when *sorghum* is inoculated with *A. rhizogenes* prior to [Ch][Lys] treatment, demonstrating that the microbe can have a positive impact on the chemical tolerance of multiple plant species.

[Ch][Lys] Reduces Root Growth of *A. thaliana* and *S. bicolor*.

At least 0.1 mM of [Ch][Lys] reduces the root growth of *A. thaliana*. At least 5 mM of [Ch][Lys] reduces the root growth of *S. bicolor*.

Discussion

An efficient assay to screen the effects of industrially-relevant chemicals on seedling development in the presence or absence or root-associated microbes is described in this study. This is used to identify previously unreported effects of chemicals on plant growth. The observed phenotypes are altered with growth in the presence of rhizobacteria. The assay, while far removed from the complexity of a natural or field ecosystem, enables future detailed exploration of plant-microbe-chemical interactions at the molecular level. Future work will add multiomics measurements, including transcriptomics, metatranscriptomics, and untargeted chemistry and metabolomics. It will also provide a system for testing hypotheses generated from data collected in more complex environments such as higher-order microbial communities or mesocosm-scale plant-soil-microbial community experiments.

Knowledge of these effects is potentially valuable—not only to informing best practice for the use of these chemicals, but also for establishing new bioactivities that may increase their value and diversify their industrial applications. The phytotoxicity of ILs, for instance, has implicated them as potential herbicides and regulators of plant growth (Pernak et al. 2013). Indeed, the 0.1 mM concentration of [Ch][Lys] sufficient to completely inhibit primary root growth in *Arabidopsis* in this work equates to 104 g/ha2, a relatively low concentration compared to contemporary herbicides (Benbrook 2016; Coupe and Capel 2016). To be relevant in situ, however, the effect of the treatment must be demonstrated across species, and in realistic environments.

Of the plant growth phenotypes induced by chemical treatment, two are of particular interest. The first is an increase in lateral root initiation and a right-handed root skew caused by 1 mM protocatechuate. Lateral root branching is governed by complex interactions between phytohormones and is an important aspect of adaptation to stress (Lavenus et al. 2013). Root curvature is similarly regulated by phytohormone transport, as well as other stimuli, which lead to changes in cell elongation (Muday 2001; Blancaflor and Masson 2003; Aloni et al. 2004). Therefore, although the mechanism of its effect on root growth remains ambiguous, protocatechuate may potentially alter *Arabidopsis* root architecture through changes to hormone signaling. The second phenotype of interest is the heterogeneous response of uninoculated *Arabidopsis* to D-limonene—no dose-response relationship was obvious. Limonene is volatile and known to oxidize to limonene hydroperoxide under aerobic conditions, the latter being more toxic to bacteria (Chubukov et al. 2015) and a greater allergen to humans (Christensson et al. 2008). Stochastic oxidation or evaporation may explain the observed variation in the effect of D-limonene on root growth and implicate volatility as an important factor affecting bioactivity.

Inoculation of the plants with *Acinetobacter* sp. 02, *Acinetobacter* sp. 03, *A. rhizogenes*, *Flavobacterium* sp., and *Paenibacillus* sp., causes plant phenotypes that are canonically associated with changes in hormone production and transport, as well as induction of plant defense pathways (Cartieaux et al. 2003; Contreras-Cornejo et al. 2015; Wang et al. 2015). Inoculation with either *Flavobacterium* sp. or *Paenibacillus* sp. has the most significant effect by decreasing primary root length and increasing the zone of lateral root initiation, demonstrating that root-associated microbes can alter both the rate of root growth and its spatial organization. It should be noted that we only used a single inoculum density in this report, and that in future, it would be interesting to explore how these phenotypes are related to the colonization rate of the roots.

Finally, the effect of several of the test chemicals on *Arabidopsis* are altered by specific microbes is observed. Both *A. rhizogenes* and *Acinetobacter* sp. 01 affect the toxicity of one or more test chemicals on *Arabidopsis*. Additionally, *A. rhizogenes* alter the impact of chemical treatments in a chemical-specific fashion. Further experimentation is required to attribute this phenotype to microbial sequestration or conversion of these tested compounds. For example, both *A. rhizogenes* and *Acinetobacter* sp. 01 contain betA and betB homologs, but they did not rescue the *Arabidopsis* [Ch][Lys] phenotype to the same extent.

Gnotobiotic plants are not found in nature, nor do plants typically interact with a single predominant microbial species. Therefore, synergism and antagonism between diverse microorganisms are likely critical to their function in situ. Indeed, a pooled consortium of 14 test microbes cause an increase in lateral root initiation that cannot be recapitulated by any of the microbes individually. Furthermore, the inclusion of *Flavobacterium* sp. and *Paenibacillus* sp.—both of which individually reduce primary root growth in the absence of chemical stress—in the pool represses the ability of the pool to restore primary root growth under [Ch][Lys] stress. Curiously, both pools have similar effects on primary root growth in the absence of chemical stress. Therefore, it is anticipated that chemical treatment will likely affect a plant differently depending on the composition of its microbiome. Despite testing in reduced-order systems, recent work is encouraging in demonstrating that such experimentation can accurately predict their interactions in larger consortia (Herrera Paredes et al. 2018; Venturelli et al. 2018). Further work is necessary to better-define the impact of synthetic microbial communities, and their ecological relevance as model systems. These studies are now being performed in conjunction with laboratory-scale micro and mesocosms, including EcoFABs or Ecotrons (Eisenhauer and Turke 2018; Gao et al. 2018.)

As climate and economic factors drive industry away from traditional, petroleum-based fuels and commodity chemicals, the need for novel and economically viable bioproduction platforms will continue to increase. The implementation of these platforms will simultaneously diversify and increase the availability of potentially bioactive compounds produced at-scale. Screens to identify unanticipated bioactivities will be important to maximize the values of these compounds, as well as to identify potential risks. The results herein suggest that the consideration of the microbiome is essential to the fidelity and veracity of ecological risk assessment at least for some vascular plants. Further, the methods used here to test for bioactivity may be coupled with more complex devices capable of controlling additional variables during ecotoxicity screens (Eisenhauer and Turke 2018; Gao et al. 2018), thereby quickly screening conditions that are increasingly representative of those found in the field. The integration of multi-omics modalities with such platforms promises to significantly accelerate our capacity to elucidate the risks and benefits associated with new and emerging industrial chemicals.

Materials and Methods

Chemicals and Reagents

Protocatechuate, D-limonene, and α-pinene are purchased with >97% purity from Sigma Aldrich, and p-coumarate from TCI America. Stocks of the ionic liquids [Ch][Lys] and [C2C1im][OAc] are prepared at close to 100% concentration as previously described (Sun et al. 2014). Each chemical is stored under ambient conditions in the dark in sealed containers, with the exception of D-limonene, which is stored under nitrogen gas at 4° C. to reduce spontaneous oxidation.

Microbial Growth Conditions

Microbial strains are maintained in glycerol stocks stored at −80° C. Media used are Lysogeny broth (LB: 10 g/L tryptone, 5 g/L yeast extract, and 5 g/L NaCl) or M9 minimal media (M9: 6.8 g/L $Na_2HPO_4$, 3 g/L $KH_2PO_4$, 1 g/L $NH_4Cl$, 0.5 g/L NaCl, 0.12 g/L $MgSO_4$) as indicated. Liquid precultures are inoculated with colonies from LB agar plates and grown overnight at 30° C., shaking at 200 RPM. Precultures are back-diluted to an $OD_{600}$ 0.1 into fresh media and grown until $OD_{600}$ 0.6, and then 2 μL per well is used to inoculate 96 well microtiter plates in a total volume of 100 μL of the media and treatment conditions indicated. Optical density is tracked at a wavelength of 600 nm using a Synergy 4 plate reader (BioTek Instruments) kept at 30° C. and shaking on "high" setting.

Plant Growth Conditions

*Arabidopsis* ecotype Col-0 seeds are obtained from the *Arabidopsis* Biological Resource Center (ABRC). Seeds are surface sterilized by a brief wash in 70% (v/v) ethanol followed by incubation in 30% (v/v) sodium hypochlorite (commercial bleach) for 15 minutes. Seeds are subsequently rinsed 5 times in sterile water, and sown on ½ Murashige and Skoog (MS) agar. Seeds are stratified (2 days, 4° C. in the dark) before transfer to a growth chamber under a 10 h light:14 h dark (22° C.). Following germination, plants are grown until the appearance of the first set of true leaves (~6 days) prior to transfer to fresh test or control agar. The lateral root number can be considered a proxy for lateral root initiation, since at the emergence of the first true leaves (i.e. treatment day 0) the most plants have yet to develop lateral roots. The change in root length is determined from the primary root length at transfer subtracted from the primary root length after 6 days of treatment.

*Sorghum* cultivar BTx623 seeds are a kind gift from Dr. Jeff Dahlberg, UCANR. Seeds are surface sterilized by rinsing 5 times in sterile water, briefly washing in 70% (v/v) ethanol+0.01% (v/v) Triton-X 100 and incubating in bleach+0.01% (v/v) Triton-X 100 on a shaker for 20 minutes. They are then rinsed in sterile water a further 3 times, sown on plates, and grown as above (although without stratification).

Root Inoculation

Rhizobacterial biomass for root inoculation experiments is generated by cultivating individual isolates at 30° C. in LB supplemented with 1% (w/v) dextrose, shaking at 200 RPM. Overnight cultures are diluted to an $OD_{600}$ of 0.1 in fresh media then grown under the same conditions to an $OD_{600}$ of 0.7. Pellets are centrifuged (2000 r.c.f.) for 10 min at room temperature, then resuspended in 1/10 volume sterile water. Plants are inoculated by momentarily submerging their roots into cell resuspensions, or in sterile water for mock-inoculated controls. Plants are transferred to fresh ½ MS agar plates immediately post-inoculation and grown as before.

Exogenous Chemical Treatment

D-limonene, α-pinene, protocatechuate, p-coumarate, [$C_2C_1$im][OAc], or [Ch][Lys] are dissolved in molten ½ MS media where indicated. 1.2 M stock solutions of p-coumarate and 1.5 M stock solutions of protocatechuate are prepared in dimethylsulfoxide (DMSO) and ethanol, respectively, before their addition to growth media. Controls of DMSO alone or ethanol alone are performed and found to have no effect on plant growth.

Microscopy

Seedlings are inoculated or chemically treated as previously described. After the treatment period roots are gently washed in sterile water and the cell walls are stained for 1 min in 10 M propidium iodide (PI, Sigma), then briefly rinsed in sterile water. Cellular morphology is determined using a Zeiss LSM 710 confocal microscope with PI fluorescence emission at 550-680 nm and 488 nm excitation.

Imaging and Root Tracing

Plants are lit from the sides and photographed using a Canon 550D camera; images are saved as JPEG files for further analysis. The contrast is adjusted to maximize root visibility, but any adjustments are applied uniformly. Root growth is quantified using ImageJ (Schneider, Rasband, and Eliceiri 2012) with the SmartRoot plugin using default parameters (Lobet, Pages, and Draye 2011).

References Cited in Example 1

Aloni R, Langhans M, Aloni E, Ullrich C I. 2004. Role of cytokinin in the regulation of root gravitropism. Planta 220:177-182.

Benbrook C M. 2016. Trends in glyphosate herbicide use in the United States and globally. Environ. Sci. Eur. 28:3.

Blancaflor E B, Masson P H. 2003. Plant gravitropism. Unraveling the ups and downs of a complex process. Plant Physiol. 133:1677-1690.

Campos B, Colbourne J K, Brown J B, Viant M R, Biales A D, Gallagher K, Henry T R, Sappington K G, Marshall S, Whale G. 2018. How omics technologies can enhance chemical safety regulation: perspectives from academia, government, and industry. Environ. Toxicol. Chem. 37:1252-1259.

Cartieaux F, Thibaud M-C, Zimmerli L, Lessard P, Sarrobert C, David P, Gerbaud A, Robaglia C, Somerville S, Nussaume L. 2003. Transcriptome analysis of Arabidopsis colonized by a plant-growth promoting rhizobacterium reveals a general effect on disease resistance. The Plant Journal 36:177-188.

Çetinkol ÖP, Dibble D C, Cheng G, Kent M S, Knierim B, Auer M, Wemmer D E, Pelton J G, Melnichenko Y B, Ralph J, et al. 2010. Understanding the impact of ionic liquid pretreatment on eucalyptus. Biofuels 1:33-46.

Chiu C C, Keeling C I, Bohlmann J. 2017. Toxicity of pine monoterpenes to mountain pine beetle. Sci. Rep. 7:8858.

Christensson J B, Johansson S, Hagvall L, Jonsson C, Börje A, Karlberg A-T. 2008. Limonene hydroperoxide analogues differ in allergenic activity. Contact Derm 59:344-352.

Chubukov V, Mingardon F, Schackwitz W, Baidoo E E K, Alonso-Gutierrez J, Hu Q, Lee T S, Keasling J D, Mukhopadhyay A. 2015. Acute Limonene Toxicity in Escherichia coli Is Caused by Limonene Hydroperoxide and Alleviated by a Point Mutation in Alkyl Hydroperoxidase AhpC. Appl. Environ. Microbiol. 81:4690-4696.

Contreras-Cornejo H A, López-Bucio J S, Méndez-Bravo A, Macías-Rodríguez L, Ramos-Vega M, Guevara-García ÁA, López-Bucio J. 2015. Mitogen-Activated Protein Kinase 6 and Ethylene and Auxin Signaling Pathways Are Involved in Arabidopsis Root-System Architecture Alterations by Trichoderma atroviride. Mol. Plant Microbe Interact. 28:701-710.

Coupe R H, Capel P D. 2016. Trends in pesticide use on soybean, corn and cotton since the introduction of major genetically modified crops in the United States. Pest Manag Sci 72:1013-1022.

Eisenhauer N, Türke M. 2018. From climate chambers to biodiversity chambers. Front. Ecol. Environ. 16:136-137.

Eudes A, Pereira J H, Yogiswara S, Wang G, Teixeira Benites V, Baidoo E E K, Lee T S, Adams P D, Keasling J D, Loqué D. 2016. Exploiting the Substrate Promiscuity of Hydroxycinnamoyl-CoA:Shikimate Hydroxycinnamoyl Transferase to Reduce Lignin. Plant Cell Physiol. 57:568-579.

Eudes A, Zhao N, Sathitsuksanoh N, Baidoo E E K, Lao J, Wang G, Yogiswara S, Lee T S, Singh S, Mortimer J C, et al. 2016. Expression of S-adenosylmethionine Hydrolase in Tissues Synthesizing Secondary Cell Walls Alters Specific Methylated Cell Wall Fractions and Improves Biomass Digestibility. Front. Bioeng. Biotechnol. 4:58.

Finkel O M, Castrillo G, Herrera Paredes S, Salas González I, Dangl J L. 2017. Understanding and exploiting plant beneficial microbes. Curr. Opin. Plant Biol. 38:155-163.

Gao J, Sasse J, Lewald K M, Zhalnina K, Cornmesser L T, Duncombe T A, Yoshikuni Y, Vogel J P, Firestone M K, Northen T R. 2018. Ecosystem Fabrication (EcoFAB) Protocols for The Construction of Laboratory Ecosystems Designed to Study Plant-microbe Interactions. J. Vis. Exp.

Goh E-B, Chen Y, Petzold C J, Keasling J D, Beller H R. 2018. Improving methyl ketone production in Escherichia coli by heterologous expression of NADH-dependent FabG. Biotechnol. Bioeng. 115:1161-1172.

Harvey B G, Wright M E, Quintana R L. 2010. High-Density Renewable Fuels Based on the Selective Dimerization of Pinenes. Energy Fuels 24:267-273.

Hayashi H, Alia, Mustardy L, Deshnium P, Ida M, Murata N. 1997. Transformation of Arabidopsis thaliana with the codA gene for choline oxidase; accumulation of glycinebetaine and enhanced tolerance to salt and cold stress. Plant J. 12:133-142.

Herrera Paredes S, Gao T, Law T F, Finkel O M, Mucyn T, Teixeira PJPL, Salas Gonzilez I, Feltcher M E, Powers M J, Shank E A, et al. 2018. Design of synthetic bacterial communities for predictable plant phenotypes. PLoS Biol. 16:e2003962.

Hollingsworth R G. 2005. Limonene, a citrus extract, for control of mealybugs and scale insects. Ec. 98:772-779.

Huang X-F, Zhou D, Lapsansky E R, Reardon K F, Guo J, Andales M J, Vivanco J M, Manter D K. 2017 Aug. 8. Mitsuaria sp. and Burkholderia sp. from Arabidopsis rhizosphere enhance drought tolerance in Arabidopsis thaliana and maize (Zea mays L.). Plant Soil:1-17. IEA. 2018. World Energy Outlook 2018. Internatinoal Energy Agency.

Langholtz M H, Stokes B. J., Eaton L M. 2016. 2016 Billion-Ton Report: Advancing Domestic Resources for a Thriving Bioeconomy, Volume 1: Economic Availability of Feedstocks. Oak Ridge, Tenn.: Oak Ridge National Laboratory.

Lappas C M, Lappas N T. 2012. D-Limonene modulates T lymphocyte activity and viability. Cell Immunol. 279:30-41.

Lavenus J, Goh T, Roberts I, Guyomarc'h S, Lucas M, De Smet I, Fukaki H, Beeckman T, Bennett M, Laplaze L. 2013. Lateral root development in Arabidopsis: fifty shades of auxin. Trends Plant Sci. 18:450-458.

Letunic I, Bork P. 2011. Interactive Tree Of Life v2: online annotation and display of phylogenetic trees made easy. Nucleic Acids Res. 39:W475-8.

Levy A, Salas Gonzalez I, Mittelviefhaus M, Clingenpeel S, Herrera Paredes S, Miao J, Wang K, Devescovi G, Stillman K, Monteiro F, et al. 2018. Genomic features of bacterial adaptation to plants. Nat. Genet. 50:138-150.

Liu D, Chen Le, Zhu X, Wang Y, Xuan Y, Liu X, Chen Lijie, Duan Y. 2018. Klebsiella pneumonia SnebYK Mediates Resistance Against Heterodera glycines and Promotes Soybean Growth. Front. Microbiol. 9:1134.

Lobet G, Pages L, Draye X. 2011. A novel image-analysis toolbox enabling quantitative analysis of root system architecture. Plant Physiol. 157:29-39.

Lundberg D S, Lebeis S L, Paredes S H, Yourstone S, Gehring J, Malfatti S, Tremblay J, Engelbrektson A, Kunin V, Del Rio T G, et al. 2012. Defining the core Arabidopsis thaliana root microbiome. Nature 488:86-90.

Mayak S, Tirosh T, Glick B R. 2004. Plant growth-promoting bacteria confer resistance in tomato plants to salt stress. Plant Physiol. Biochem. 42:565-572.

Mortimer J C. 2018 Sep. 24. Plant synthetic biology could drive a revolution in biofuels and medicine. Exp. Biol. Med.:1535370218793890.

Muday G K. 2001. Auxins and tropisms. Journal of Plant Growth Regulation 20:226-243.

Nam S-Y, Chung C, Seo J-H, Rah S-Y, Kim H-M, Jeong H-J. 2014. The therapeutic efficacy of α-pinene in an experimental mouse model of allergic rhinitis. Int. Immunopharmacol. 23:273-282.

Neupane B, Konda NVSNM, Singh S, Simmons B A, Scown C D. 2017. Life-Cycle Greenhouse Gas and Water Intensity of Cellulosic Biofuel Production Using Cholinium Lysinate Ionic Liquid Pretreatment. ACS Sustain. Chem. Eng. 5:10176-10185.

Pérez-Pimienta J A, Vargas-Tah A, López-Ortega K M, Medina-López Y N, Mendoza-Pérez J A, Avila S, Singh S, Simmons B A, Loaces I, Martinez A. 2017. Sequential enzymatic saccharification and fermentation of ionic liquid and organosolv pretreated agave bagasse for ethanol production. Bioresour. Technol. 225:191-198.

Pernak J, Niemczak M, Materna K, Marcinkowska K, Praczyk T. 2013. Ionic liquids as herbicides and plant growth regulators. Tetrahedron 69:4665-4669.

Phelan R M, Sekurova O N, Keasling J D, Zotchev S B. 2015. Engineering terpene biosynthesis in Streptomyces for production of the advanced biofuel precursor bisabolene. ACS Synth. Biol. 4:393-399.

Pinedo I, Ledger T, Greve M, Poupin M J. 2015. Burkholderia phytofirmans PsJN induces long-term metabolic and transcriptional changes involved in Arabidopsis thaliana salt tolerance. Front. Plant Sci. 6:466.

Riou N, Le Rudulier D. 1990. Osmoregulation in Azospirillum brasilense: glycine betaine transport enhances growth and nitrogen fixation under salt stress. J. Gen. Microbiol. 136:1455-1461.

Rivas da Silva A C, Lopes P M, Barros de Azevedo M M, Costa D C M, Alviano C S, Alviano D S. 2012. Biological activities of α-pinene and β-pinene enantiomers. Molecules 17:6305-6316.

Sasaki Y, Eng T, Herbert R A, Trinh J, Chen Y, Rodriguez A, Gladden J, Simmons B A, Petzold C J, Mukhopadhyay A. 2019. Engineering Corynebacterium glutamicum to produce the biogasoline isopentenol from plant biomass hydrolysates. Biotechnol Biofuels 12:41.

Schneider C A, Rasband W S, Eliceiri K W. 2012. NIH Image to ImageJ: 25 years of image analysis. Nat. Methods 9:671-675.

Sun N, Parthasarathi R, Socha A M, Shi J, Zhang S, Stavila V, Sale K L, Simmons B A, Singh S. 2014. Understanding pretreatment efficacy of four cholinium and imidazolium ionic liquids by chemistry and computation. Green Chem. 16:2546-2557.

Tracy N I, Chen D, Crunkleton D W, Price G L. 2009. Hydrogenated monoterpenes as diesel fuel additives. Fuel 88:2238-2240.

Venturelli O S, Carr A C, Fisher G, Hsu R H, Lau R, Bowen B P, Hromada S, Northen T, Arkin A P. 2018. Deciphering microbial interactions in synthetic human gut microbiome communities. Mol. Syst. Biol. 14:e8157.

Wang J, Zhang Y, Li Y, Wang X, Nan W, Hu Y, Zhang H, Zhao C, Wang F, Li P, et al. 2015. Endophytic microbes Bacillus sp. LZR216-regulated root development is dependent on polar auxin transport in Arabidopsis seedlings. Plant Cell Rep. 34:1075-1087.

Wilson I D, Nicholson J K. 2017. Gut microbiome interactions with drug metabolism, efficacy, and toxicity. Transl Res 179:204-222.

Yuan X, Duan Y, He L, Singh S, Simmons B, Cheng G. 2017. Characterization of white poplar and eucalyptus after ionic liquid pretreatment as a function of biomass loading using X-ray diffraction and small angle neutron scattering. Bioresour. Technol. 232:113-118.

Zahi M R, El Hattab M, Liang H, Yuan Q. 2017. Enhancing the antimicrobial activity of d-limonene nanoemulsion with the inclusion of F-polylysine. Food Chem. 221:18-23.

Zhang Y, Butelli E, Alseekh S, Tohge T, Rallapalli G, Luo J, Kawar P G, Hill L, Santino A, Fernie A R, et al. 2015. Multi-level engineering facilitates the production of phenylpropanoid compounds in tomato. Nat. Commun. 6:8635.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

All cited references are hereby each specifically incorporated by reference in their entireties.

What is claimed is:

1. A method for controlling the growth of one or more plants, comprising applying an herbicidal composition comprising a cholinium lysinate [Ch][Lys] to a plant or soil in a place where the plant grows or will grow.

2. The method of claim 1, wherein the plant is a monocot or dicot.

3. The method of claim 1, wherein the plant is a weed, such as Johnson grass, quack grass, barnyard grass), and/or woolly cupgrass; or a non-native invasive plant, such as the brown algae Sargassum.

4. The method of claim 1, wherein the plant is an Arabidopsis species or Sorghum species.

5. The method of claim 1, wherein the weed is resistant to a glyphosate or a salt thereof.

6. The method of claim 1, wherein the soil is a cropland, or a uncultivated land deliberately not developed in order to promote the growth of native flora and/or fauna.

7. The method of claim 1, wherein the applying step comprises applying at least about 100 g of cholinium lysinate [Ch][Lys] to each hectare of cropland.

8. The method of claim 7, wherein the applying step comprises applying at least about 500 g of cholinium lysinate [Ch][Lys] to each hectare of cropland.

9. The method of claim 8, wherein the applying step comprises applying at least about 1 kg of cholinium lysinate [Ch][Lys] to each hectare of cropland.

10. The method of claim 9, wherein the applying step comprises applying at least about 5 kg of cholinium lysinate [Ch][Lys] to each hectare of cropland.

11. The method of claim 10, wherein the applying step comprises applying at least about 10 kg of cholinium lysinate [Ch][Lys] to each hectare of cropland.

12. The method of claim 7, wherein the method further comprises planting a commercial crop after the applying step.

* * * * *